United States Patent
Sugiura et al.

(10) Patent No.: US 10,789,488 B2
(45) Date of Patent: Sep. 29, 2020

(54) INFORMATION PROCESSING DEVICE, LEARNED MODEL, INFORMATION PROCESSING METHOD, AND COMPUTER PROGRAM PRODUCT

(71) Applicant: KABUSHIKI KAISHA TOSHIBA, Tokyo (JP)

(72) Inventors: Takayuki Sugiura, Yokohama Kanagawa (JP); Tomoki Watanabe, Inagi Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 105 days.

(21) Appl. No.: 15/919,069

(22) Filed: Mar. 12, 2018

(65) Prior Publication Data
US 2019/0114490 A1 Apr. 18, 2019

(30) Foreign Application Priority Data

Oct. 18, 2017 (JP) .................................. 2017-201786

(51) Int. Cl.
| | | |
|---|---|---|
| G01S 13/931 | (2020.01) | |
| G01S 17/89 | (2020.01) | |
| G01S 17/931 | (2020.01) | |
| G06K 9/00 | (2006.01) | |

(Continued)

(52) U.S. Cl.
CPC .......... *G06K 9/00805* (2013.01); *G01S 17/89* (2013.01); *G01S 17/931* (2020.01); *G08G 1/16* (2013.01)

(58) Field of Classification Search
None
See application file for complete search history.

(56) References Cited

U.S. PATENT DOCUMENTS

| | | | | |
|---|---|---|---|---|
| 8,116,558 B2* | 2/2012 | Hayashi | ................. | G01B 11/24 345/419 |
| 8,121,399 B2* | 2/2012 | Hayashi | ................. | G01B 11/24 345/419 |
| 10,108,867 B1* | 10/2018 | Vallespi-Gonzalez | ....................... | G01S 17/86 |

(Continued)

FOREIGN PATENT DOCUMENTS

JP 5407898 8/2011

OTHER PUBLICATIONS

Dequaire et al., "Deep tracking in the wild: End-to-end tracking using recurrent neural networks," The International Journal of Robotics Research, vol. 37(4-5): 492-512, first published on Jun. 22, 2017 (Year: 2017).*
NVIDA Tesla GPU Accelerators Datasheet (Year: 2014).*
E. Casapietra et al., "Building a Probabilistic Grid-based Road Representation from Direct and Indirect Visual Cues," IEEE Intelligent Vehicles Symposium (IV) (Jun. 28-Jul. 1, 2015) pp. 273-279.

(Continued)

*Primary Examiner* — Soo Shin
(74) *Attorney, Agent, or Firm* — Finnegan, Henderson, Farabow, Garrett & Dunner, L.L.P.

(57) ABSTRACT

According to an embodiment, an information processing device includes one or more processors. The one or more processors is configured to acquire a map in which, for each of grids in a particular space, observation information representing object information on an object or the observation information representing non-observation information on non-observation of the object is correlated; and correct, for each of the grids, correlation of the observation information by using a learned model based on the observation information correlated with other peripheral grids.

20 Claims, 14 Drawing Sheets

(51) Int. Cl.
  *G06K 9/62* (2006.01)
  *G08G 1/16* (2006.01)

(56) References Cited

U.S. PATENT DOCUMENTS

| | | | | |
|---|---|---|---|---|
| 10,395,117 | B1* | 8/2019 | Zhang | G06K 9/4604 |
| 2016/0132056 | A1* | 5/2016 | Yoshino | G01S 17/08 |
| | | | | 701/23 |
| 2016/0375592 | A1* | 12/2016 | Szatmary | B25J 19/06 |
| | | | | 700/255 |
| 2019/0035100 | A1* | 1/2019 | Ebrahimi Afrouzi | |
| | | | | G06T 7/0002 |

OTHER PUBLICATIONS

P. Ondruska et al., "Deep Tracking: Seeing Beyond Seeing Using Recurrent Neural Networks," Association for the Advancement of Artificial Intelligence (AAAI)-16 Conference (Feb. 12-17, 2016) 7 pages.

J, Dequaire et al, "Deep Tracking on the Move: Learning to Track the World from a Moving Vehicle using Recurrent Neural Networks," arXiv: 1609.09365v3 (2016) 8 pages.

J. Dequaire et al., "Deep tracking in the wild: End-to-end tracking using recurrent neural networks," International Journal of Robotics Research (IJRR) (2017) 21 pages.

A. Pronobis et al., "LibSPN: A Library for Learning and Inference with Sum-Product Networks and TensorFlow," ICML 2017 Workshop on Principled Approaches to Deep Learning (2017) 9 pages.

S. Wirges et al., "Evidential Occupancy Grid Map Augmentation using Deep Learning," arXiv:1801.05297v1 (2018) 6 pages.

* cited by examiner

INFORMATION PROCESSING DEVICE, LEARNED MODEL, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-201786, filed on Oct. 18, 2017; the entire contents of which are incorporated herein by reference.

FIELD

Embodiments described herein relate generally to an information processing device, a learned model, an information processing method, and a computer program product.

BACKGROUND

A technique for estimating an obstacle, a road, and the like hidden in a position that is not observed by a sensor has been known. For example, a technique for estimating an object that can appear from a blind area on the basis of a position and a size of the blind area and the length of the border between the blind area and a non-blind area has been disclosed. In another disclosed technique, using a result of tracking other vehicles, a future travel direction and a trajectory of the past movement in the blind area are estimated, so that a position of a road where a vehicle can pass is estimated. Moreover, a technique of estimating a position of an object when the object that is observed once is included in a blind area by tracking the position of the object using time-series data has been disclosed.

However, in the conventional techniques, when the result of tracking other vehicles, is not used or the object is not included in the time-aeries data, it has been difficult to accurately estimate the object at a non-observation position.

DETAILED DESCRIPTION

According to an embodiment, an information processing device includes one or more processors. The one or more processors is configured to acquire a map in which, for each of grids in a particular space, observation information representing object information on an object or the observation information representing non-observation information on non-observation of the object is correlated; and correct, for each of the grids, correlation of the observation information by using a learned model based on the observation information correlated with other peripheral grids.

With reference the attached drawings, an information processing device, a learned model, an information processing method, and a computer program product will hereinafter be described in detail. In embodiments and modifications below, components with the same function are denoted by the same reference symbol and the detailed description may be omitted.

First Embodiment

Figure 1:
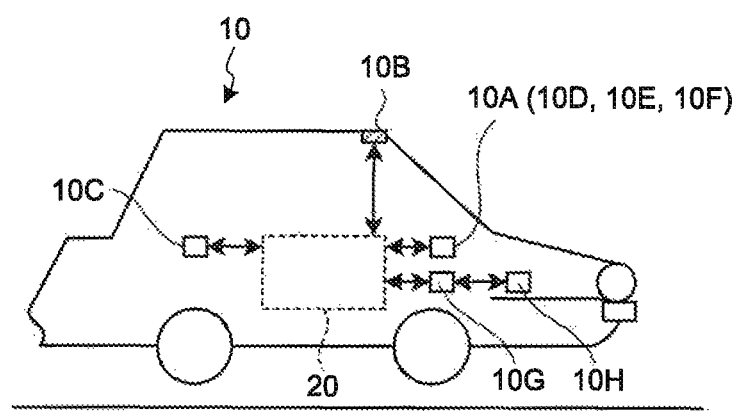
FIG. 1 is a diagram illustrating one example of a moving body.

FIG. 1 is a diagram illustrating one example of a moving body 10 according to the present embodiment.

The moving body 10 includes an information processing device 20, an output unit 10A, a sensor 10B, an input device 100, a driving control unit 10G, and a driving unit 10H.

The information processing device 20 is, for example, a dedicated or general-purpose computer. In the example described in the present embodiment, the information processing device 20 is mounted on the moving body 10.

The moving body 10 is a movable object. The moving body 10 is, for example, a vehicle (motorcycle, four-wheel vehicle, bicycle), a carriage, a robot, a ship, a flying object (such as aircraft, unmanned aerial vehicle (UAV), drone), a person, an animal, or the like. The moving body 10 is, specifically, a moving body that travels through a person's driving operation, or a moving body that can travel automatically (autonomous travel) without a person's driving operation. The moving body capable of the automatic travel is, for example, an automated driving vehicle. In the example described in the present embodiment, the moving body 10 is a vehicle capable of the autonomous travel.

Note that the information processing device 20 is not limited to a mode in which the information processing device 20 is mounted on the moving body 10. The information processing device 20 may alternatively be mounted on a stationary object. The stationary object is an unmovable object or an object that stands still relative to the ground. Examples of the stationary object include a guardrail, a pole, a building, a road, a sidewalk, an obstacle, a stereoscopic object, a parked vehicle, and a road sign. The information processing device 20 may be mounted on a cloud server that executes processes on the cloud.

The sensor 10B is one example of a sensing unit. The sensor 10B is an external sensor, and acquires sensing information by sensing an external environment.

The sensor 10B is, for example, a photographing device, a distance sensor (millimeter-wave radar, laser sensor), or the like. The photographing device obtains photograph image data (hereinafter referred to as a camera image) through photographing. The camera image data is digital image data in which a pixel value is defined for each pixel, a depth map in which the distance from the sensor 10B is defined for each pixel, or the like. The laser sensor is, for example, a two-dimensional laser imaging detection and ranging (LIDAR) sensor or a three-dimensional LIDAR sensor set in parallel to a horizontal plane.

In the example described in the present embodiment, the sensor 10B is a two-dimensional LIDAR sensor.

Figure 2:
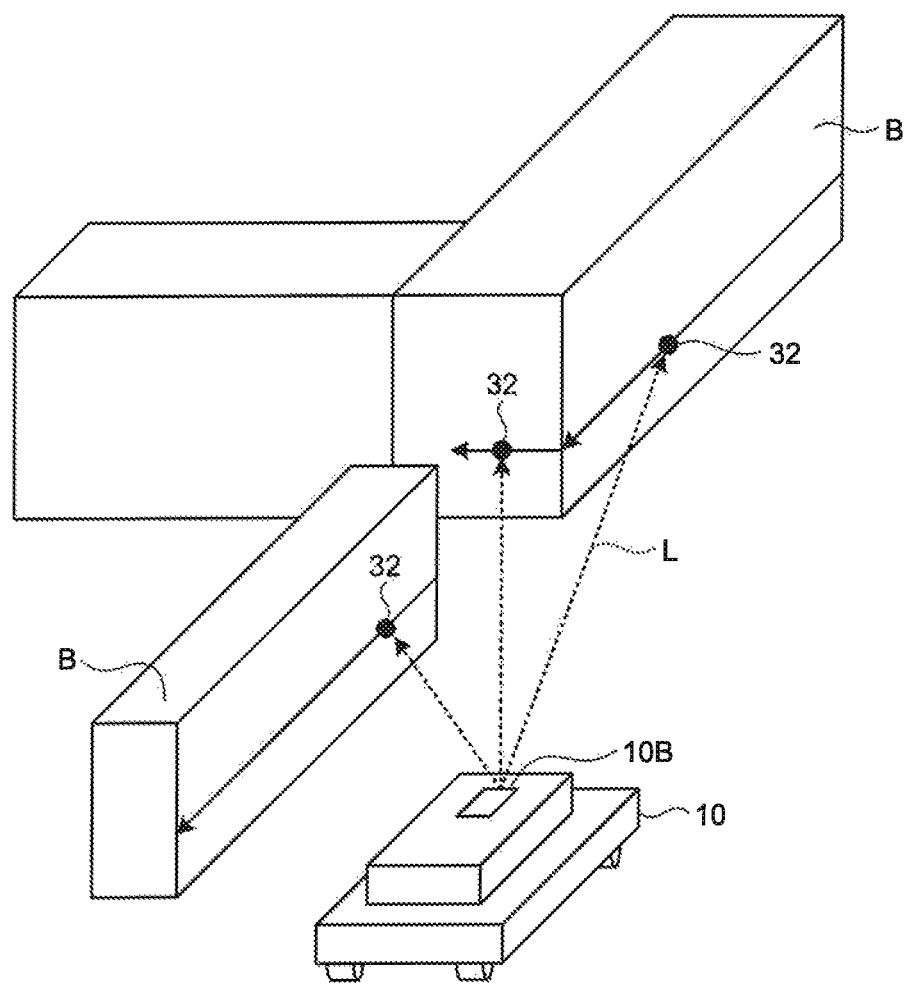
FIG. 2 is an explanatory diagram of sensing by a sensor.

FIG. 2 as an explanatory diagram of sensing by the sensor 10B. The sensor 10B mounted on the moving body 10 emits laser light L along an observation plane around the sensor 10B, and receives reflection light reflected on objects (targets) B. The observation plane is, for example, a horizontal plane. This enables the sensor 10B to obtain the sensing information of a plurality of points 32 corresponding to a plurality of reflection points along an external shape of the objects B. Note that the position of the objects B, the number of objects B, the number of points 32, and the positions of the points 32 in FIG. 2 are just one example and are not limited to those illustrated therein.

Note that the sensor 10B may emit one line of laser light L in a horizontal direction and receive the reflection light of the laser light L, or may emit a plurality of lines of laser light L and receive the reflection light of the laser light L. The sensor 10B may emit the laser light L along a plane intersecting with the horizontal plane.

The sensing information represents the position of each of the plurality of points 32 around the sensor 108. The position of the point 32 is represented by, for example, a position coordinate representing the relative position based on the sensor 10B, a position coordinate representing the absolute position of the point. 32, a vector, or the like.

Specifically, the position of the point 32 is represented by an azimuth direction corresponding to a direction in which the laser light is delivered based on the sensor 10B, and the distance from the sensor 108. That is to say, when the sensor 108 is a LIDAR, the sensing information is represented by the distance and the azimuth direction using the sensor 10B as an origin in a polar coordinate space. The polar coordinate space is a space represented by a polar coordinate system.

The distance from the sensor 108 is derived from the time passed from the emission of the laser light L to the reception of the reflection light, the intensity of the received light, the attenuation ratio of the light, or the like. The detection intensity of the point. 32 is represented by, for example, the intensity of the reflection light, or the attenuation ratio of the light intensity.

When the sensing information is a camera image photographed by the sensor 10B as a photographing camera, the position of the point 32 may be represented by a pixel position in the camera image or a position coordinate in a rectangular coordinate space. The rectangular coordinate space is a space represented by a rectangular coordinate system.

The output unit 10A outputs various kinds of output information. The output unit 10A includes a function of, for example, a communication function to transmit output information, a display function to display output information, a sound output function to output a sound representing output information, and the like. For example, the output, unit 10A includes a communication unit 10D, a display 10E, and a speaker 10F.

The communication unit 10D transmits the output information to another device. For example, the communication unit 10D transmits the output information through a known communication line. The display 10E displays the output information. The display 10E is, for example, a known liquid crystal display (LCD), a projection device, a light, or the like. The speaker 10F outputs a sound representing the output information.

The input device 10C receives various instructions and information input from a user. The input device 10C is, for example, a pointing device such as a mouse or a track hall, or an input device such as a key board.

The driving unit 10H is a device that drives the moving body 10. The driving unit 10H is, for example an engine, a motor, a wheel, or the like.

The driving control unit 10G controls the driving unit 10H. The driving unit 10H is driven by the control of the driving control unit 10G. For example, the driving control unit 10G determines the peripheral circumstances on the basis of the output information output from the information processing device 20, the information obtained from the sensor 10B, and the like, and performs controls over an accelerating amount, a braking amount, a steering angle, and the like. For example, if it is estimated that a road exists in a blind area, the driving control unit 10G controls the vehicle so that the speed is decreased around that road.

Figure 3:
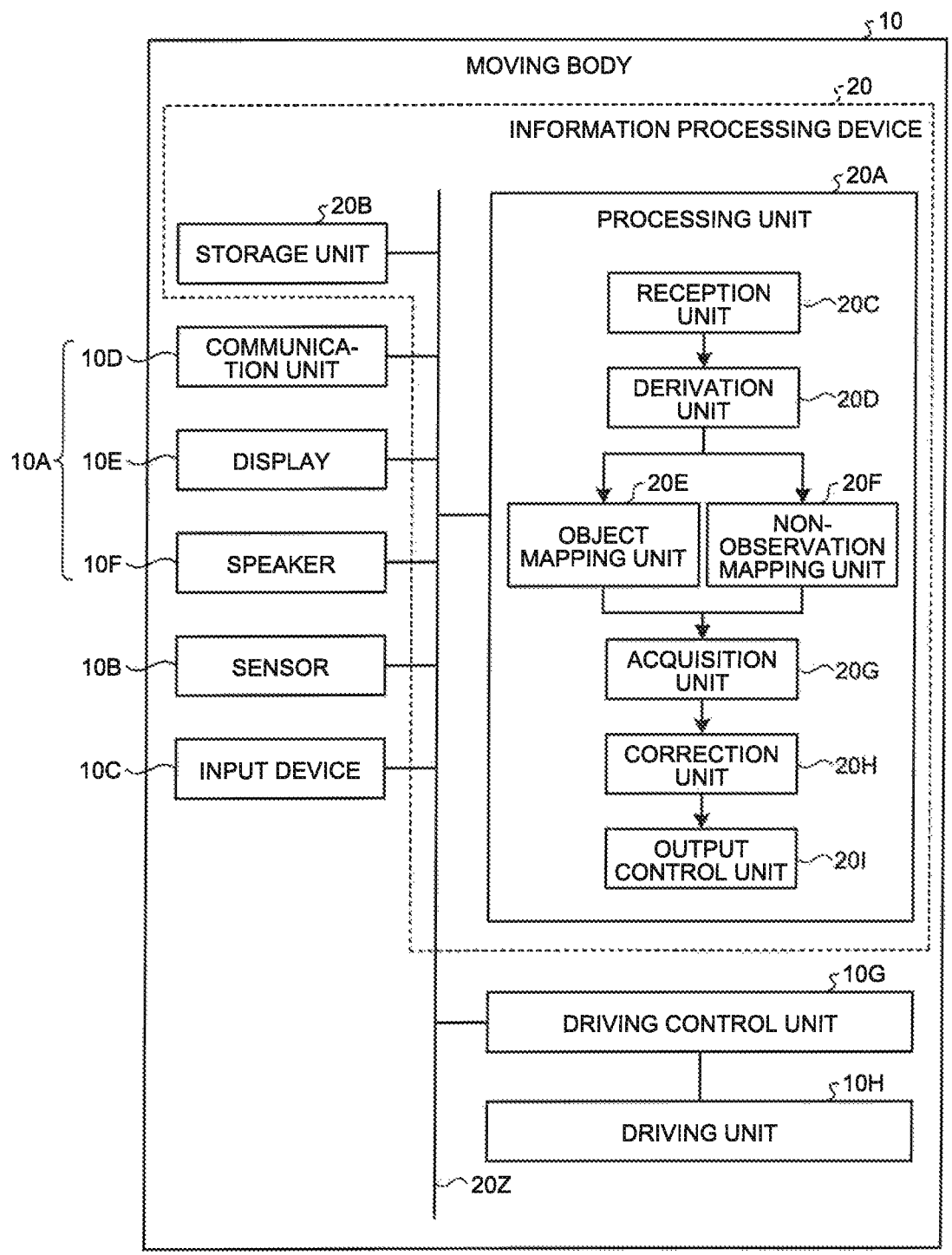
FIG. 3 is a block diagram illustrating one example of a structure of an information processing device.

Next, detailed description is made of a structure of the information processing device 20. FIG. 3 is a block diagram illustrating one example of a structure of the information processing device 20.

The information processing device 20 is, for example, a dedicated or general-purpose computer. The information processing device 20 includes a processing unit 20A and a storage unit 20B.

The processing unit 20A, the storage unit 20B, the output unit 10A, the sensor 10B, and the input device 10C are connected through a bus 20Z. Note that the storage unit 20B, the output unit 10A (communication unit 10D, display 10E, speaker 10F), the sensor 10B, and the input device 100 may be connected to the processing unit 20A with or without a wire. At least one of the storage unit 20B, the output unit 10A (communication unit 100, display 10E, speaker 10F), the sensor 10B, and the input device 100 may be connected to the processing unit 20A through a network.

The storage unit 20B stores various kinds of data. The storage unit 20B is, for example, a semiconductor memory element such as a random access memory (RAM) or a flash memory, a hard disk, an optical disk, or the like. The storage unit 20E may be a storage device provided outside the information processing device 20. The storage unit 20B may be a storage medium. Specifically, the storage medium may be a storage medium in which computer programs or various kinds of information obtained by downloading through a local area network (LAN), the Internet, or the like are stored or temporarily stored. The storage unit 20B may include a plurality of storage media. The storage unit 20B may be provided in a cloud server connected to the information processing device 20 through a network.

The processing unit 20A includes a reception unit 20C, a derivation unit 200, an object mapping unit 20E, a non-observation mapping unit 20F, an acquisition unit 20G, a correction unit 20H, and an output control unit 20I.

Each of these units (reception unit 20C, derivation unit 20D, object mapping unit 20E, non-observation mapping unit 20F, acquisition unit 20G, correction unit 20H, and output control unit 20I) is achieved by, for example, one or a plurality of processors. For example, each of these units may be achieved by having a processor such as a central processing unit (CPU) executes computer programs, that is, by using software. Each of these units may alternatively be achieved by a processor such as a dedicated integrated circuit (IC), that is, by using hardware. Each of these units may be achieved by using both software and hardware. In the case of using a plurality of processors, each processor may achieve one of these units or two or more of these units.

The reception unit 20C receives sensing information from the sensor 10B. The reception unit 20C outputs the received sensing information to the derivation unit 200. For example, the sensor 10B detects an external environment and outputs the sensing information to the reception unit 20C at every predetermined timing. Every time the reception unit 20C receives the sensing information, the reception unit 20C outputs the received sensing information to the derivation unit 20D sequentially.

The derivation unit 20D derives observation information from the sensing information for each position in an actual space sensed by the sensor 10B. The observation information is the information representing the observation result around the moving body 10 (sensor 10B).

Figure 4:
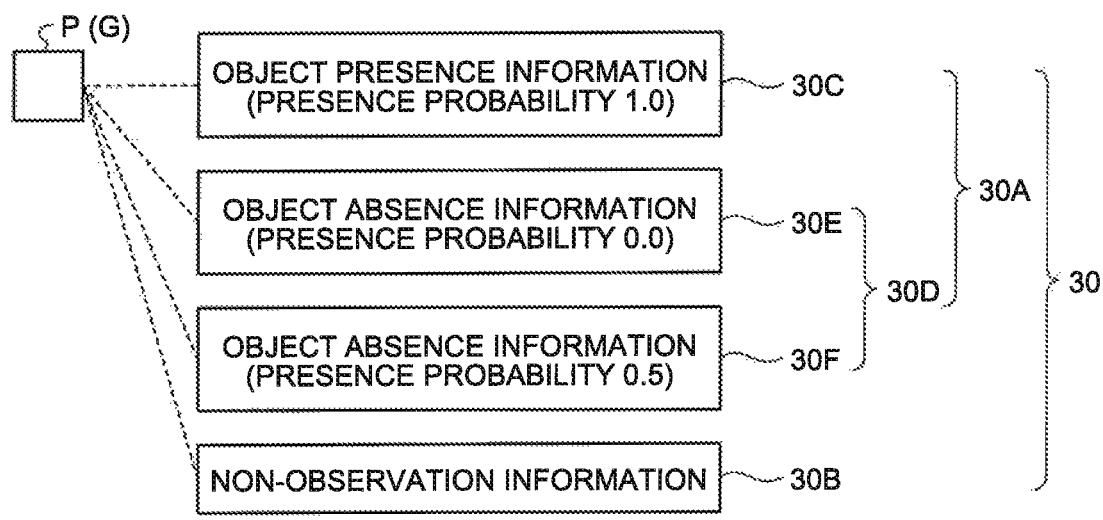
FIG. 4 is an explanatory diagram illustrating one example of a data structure of observation information.

FIG. 4 is an explanatory diagram illustrating one example of a data structure of observation information 30. The observation information 30 represents object information 30A or non-observation information 30B.

The object information 30A is information do the object B. The object B exists in the external environment around the sensor 10B, and is observed by the sensor 10B.

The object B may be either a moving body or a stationary object. The definition of the moving object and the stationary object is as described above. The object B may be either a living thing or a non-living thing. The living thing is, for example, a person, an animal, a plant, or the like. The non-living thing is, for example, a vehicle, an object that can fly, a robot, a building, a guard rail, a road surface of a driveway, a sidewalk, or the like, a region in which travel is possible, an obstacle, or the like. The region in which travel is possible corresponds to a region in which the moving, body 10 can travel. The obstacle is an object that interrupts the travel. In the example described in the present embodiment, the object B is an obstacle.

In the present embodiment, the object information 30A represents object presence information 30C or object absence information 30D.

The object presence information 30C is information representing the presence of the object B. That is to say, the object presence information 30C is the information representing that the object B is present. The object absence information 30D is information representing the absence of the object B. That is to say, the object absence information 30O is the information representing that the object B is absent. Note that the object absence information 30D is classified into a plurality of kinds by a process to be described below (the details will be described below). The object presence information 30C may be information representing the presence of one object B or information representing the presence of a plurality of objects B.

The non-observation information 303 is information on the non-observation of the object. B. More specifically, the non-observation information 30B is information representing that the sensing by the sensor 10B has failed because the laser light L from the sensor 10B does not reach. That is to say, the non-observation information 30B is information representing that the presence or absence of the object B is unknown. The case in which the laser light L from the sensor 10B does not reach corresponds to, for example, a case in which the place is in a blind area due to another object B, the place is out of the viewing angle of a camera, the place is at a position where the reflection light cannot be measured, or the place is out of a range where the sensor 10B is sensible, or a case in which a reflector does not exist so that the reflection of the laser light L cannot be measured and the distance therefore cannot be measured.

The object presence information 30C may be the information representing the attribute of the object B or the presence probability of the object B.

The derivation unit 20D derives the observation information 30 for each position P in the actual space by using the sensing information representing the position of each of the plurality of points 32 around the sensor 10B.

Figure 5:
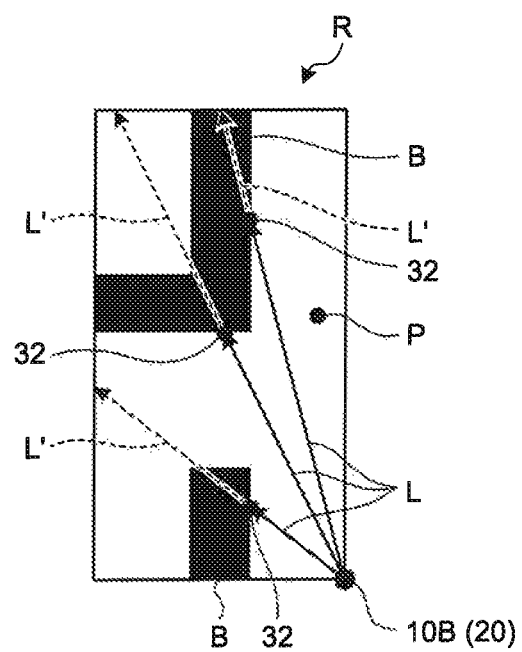
FIG. 5 is a schematic diagram illustrating one example of an actual space.

FIG. 5 is a schematic diagram illustrating one example of an actual space R around the sensor 10B. The actual space R is a space represented by a rectangular coordinate system. For example, it is assumed that the sensor 10B has sensed a group of points 32 on a surface of the object B in the actual space R. In this case, the derivation unit 20D receives the sensing information representing the position of each of the points 32 in the actual space R from the sensor 10B through the reception unit 200.

Back to FIG. 3, the derivation unit 20D specifies the point 32 representing the object B among the points 32 indicated by the sensing information. In the present embodiment, the derivation unit 200 determines the point 32 detected by the two-dimensional LIDAR (sensor 10B) set in parallel to the horizontal plane as an obstacle with a certain height from the road surface, and specifies this point 32 as the point 32 representing the object B. Then, the derivation unit 20D derives the object presence information 30C representing the presence of the object B in regard to the position P of the specified point 32.

In addition, in regard to the position P the laser light L has passed from the sensor 10B to the object B in the actual space R, the derivation unit 20D assumes that the object B as the obstacle blocking the laser light L does not exist and derives the object absence information 30D representing that the object B is absent.

On the other hand, in regard to the position P in the actual space R farther than the point 32, which is specified as the point that represents the presence of the object B, from the set position of the sensor 10B, the derivation unit 20D derives the non-observation information 30B representing that the object B is not observed. That is to say, in regard to the position P farther than the object B from the sensor 10B, the laser light L is blocked by the object B and does not reach (see laser light L'); therefore, the presence or absence of the object B is unknown. Therefore, the derivation unit 20D derives the non-observation information 30B in regard to the position P in the actual space R farther from the sensor 10B than the point 32 that is specified as the point representing the presence of the object B.

Note that the derivation unit 20D may derive the non-observation information 30B by another method. For example, the derivation unit 20D sets the detectable distance or angle range of the sensor 10B in advance. Then, the derivation unit 20D may derive the non-observation information 30B in regard to the position P in the distance and angle range where the measurement has failed due to the absorption of the laser light L, for example.

In this manner, the derivation unit 20D derives the observation information 30 for each position P in the actual space R.

Note that if the sensor 10B is a photographing device, the sensing information obtained by the sensor 10B a camera image. In this case, the derivation unit 20D may derive the observation information 30 for each position P of the pixel included in the camera image by known template matching. In this case, the derivation unit 20D may derive the observation information 30 for each position P of the pixel by using semantic segmentation in which the attribute of the object B is estimated for each pixel. Moreover, the derivation unit 20D may derive the observation information 30 by estimating the distance from the sensor 10B to the object B. To estimate the distance, the derivation unit 20D performs a three-dimensional reconstruction by tracking the characteristic point in the camera image.

In the case of using the camera image as the sensing information, the derivation unit 20D may derive the non-observation information 30B in regard to the position P of the pixel where the template matching is not performed or the position P of the pixel where the attribute is not estimated.

Note that the observation information 30 may be the information in which the presence or absence of the object B is represented in binary.

As described above, in the present embodiment, the observation information 30 is the information representing the object presence information 30C, the object absence information 30D, or the non-observation information 30B. Therefore, for example, the observation information 30 may be represented by continuous values of the presence probability of the object B or the like, or the attribute of the object B represented by a label of the semantic segmentation. The attribute is, for example, the kind of the object B. The kind of the object B may include, in addition to the definition of the object B described above, the information representing whether the object is the object B to be estimated.

Back to FIG. 3, the description is continued. The derivation unit 20D derives the observation information 30 in this manner in regard to each position P in the actual space R. Then, the derivation unit 20D outputs the observation information 30 at each position P in the actual space R to the object mapping unit 20E and the non-observation mapping unit 20F.

Figure 6:
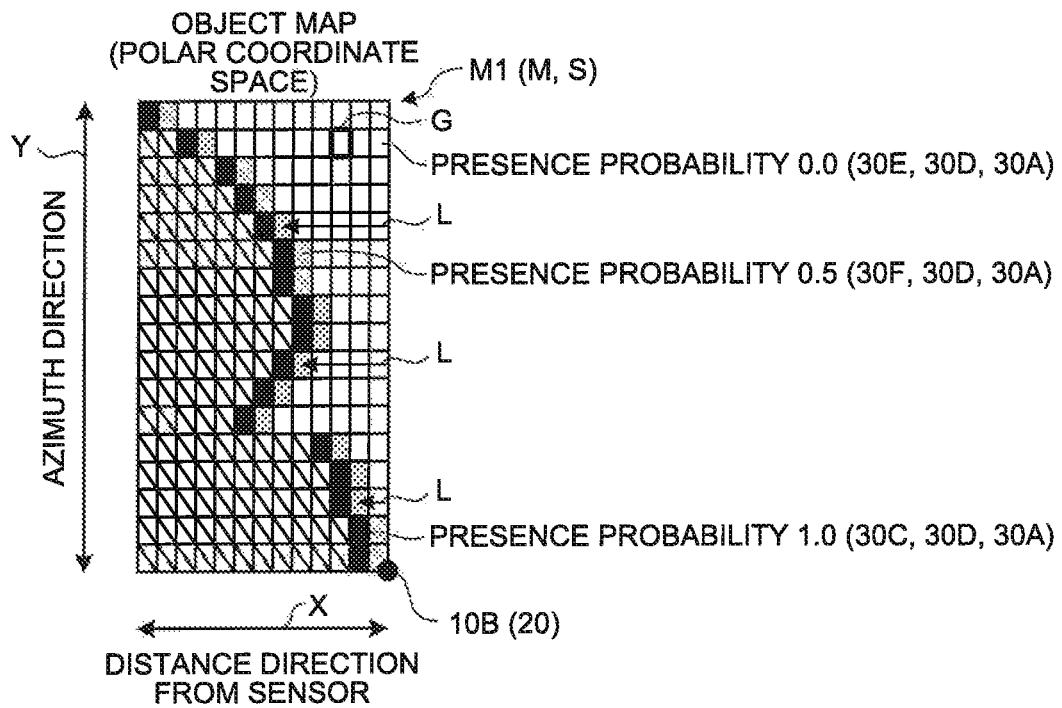
FIG. 6 is an explanatory diagram illustrating one example of a process performed by an object mapping unit.

Next, the object mapping unit 20E is described. FIG. 6 is an explanatory diagram illustrating one example of a process performed by the object mapping unit 20E.

The object mapping unit 20E correlates the object information 30A, which is represented by the observation information 30 received from the derivation unit 20D, with corresponding grid G in a particular space S. That is, the object mapping unit 20E correlates the object presence information 30C or the object absence information 30D with the grids G in the particular space S.

The particular space S is a space in which the actual space R is represented by a coordinate system. The coordinate system is a polar coordinate system or a rectangular coordinate system. In the example described in the present embodiment, the particular space S is a space in which the actual space R is represented by a polar coordinate system, that is, a polar coordinate space. The polar coordinate space is defined by the azimuth direction (arrow Y direction) using the sensor 10B (information processing device 20) as an origin, and the distance direction from the sensor 10B (arrow X direction) on an observation plane of the sensor 10B. The azimuth direction represents the angle at which the laser light L is delivered, on the basis of the direction passing the sensor 10B and orthogonal to the traveling direction of the moving body 10 including the sensor 10B.

The grid G corresponds to each region obtained by dividing the particular space S into a plurality of regions. Specifically, the grid G is each region obtained by dividing the particular space S into the plurality of regions along the coordinate axes of the particular space S. That is to say, the particular space S is represented by the plurality of grids G arrayed in two axial directions along the coordinate axes. Note that the coordinate axes are the coordinate axes of the rectangular coordinate or the polar coordinate. In the present embodiment, since the particular space S is the polar coordinate space as described above, the coordinate axes are the coordinate axes of the polar coordinate.

Note that FIG. 6 illustrates one example in which the row direction represented by the array of the grids G and the azimuth direction (arrow Y direction) are the same and the column direction represented by the array of the grids C and the distance direction (arrow X direction) are the same. However, the present invention is not limited to this example.

In fact, the identification numbers of the rows and the columns represented by the array of grids C may be discrete values obtained by equally dividing each of the azimuth and the distance. That is to say, each grid G corresponds to the region around the moving body 10 (information processing device 20).

The shape of the grid G is not limited to a particular shape. In addition, the size of the grid G is not limited to a particular size. For example, the size of the grid G is more than or equal to the size of the point 32 obtained by the sensor 10B (see FIG. 2, FIG. 5). Note that the size of the grid G may be adjusted as appropriate in accordance with the object B to be estimated.

Note that the size of the grid G may be either constant or different in the particular space S. For example, the grid G may have a larger size as the grid G is away from the sensor 10B. In the particular space S represented by the polar coordinate space using the sensor 10B as the origin, the grid G may be smaller in a particular angle range in which the sensor 10B is the origin than in the angles other than that particular angle range.

The particular space S may be either a two-dimensional space or a three-dimensional space. When the particular space S is a three-dimensional space, the grids G may be arrayed in a three-dimensional direction (triaxial directions).

The object mapping unit 20E specifies the observation information 30 representing the object information 30A in the observation information 30 for each position P in the actual space R received from the derivation unit 20D. Then, the object mapping unit 20E correlates the object information 30A with the grid G in the particular space S at the position P of the observation information 30 representing the object information 30A. As described above, the object information 30A represents the object presence information 30C or the object absence information 30D. Therefore, the object mapping unit 20E correlates the object presence information 30C or the object absence information 30D as the object information 30A with each grid G. By this correlation, the object mapping unit 20E generates an object map M1.

The correlation by the object mapping unit 20E is specifically described. For example, the object mapping unit 20E correlates the position P in the actual space R and the grid G at the corresponding position in the map M for each direction (azimuth direction) in which the laser light L is delivered by the sensor 10B. Specifically, the object mapping unit 20E specifies, among the rows of the grids G in each azimuth direction of the laser light L by the sensor 10B, the row where the object B has been sensed. The row of the grids G in each azimuth direction refers to the row including the grids G arrayed along the distance direction (arrow X direction) and each of the rows disposed along the azimuth direction (arrow Y direction).

Then, the object mapping unit 20I correlates the object presence information 30C with the grid G at the position P where the object B is sensed among the grids G constituting the specified row. The position P where the object B is sensed is the position P where the derivation unit 20D has derived the object presence information 30C.

The object mapping unit 20I correlates the object absence information 30D with the grid G positioned closer to the sensor 10B than the grid G at the position P where the object B is sensed in the grids G constituting the specified row, because in this grid G, the object B does not exist and the laser light has passed.

In this manner, the object mapping unit 20B correlates the object presence information 30C or the object absence information 30D with each row of grids G in each direction for each direction in which the laser light is delivered by the sensor 10B.

In the present embodiment, the object mapping unit 20E correlates the presence probability of the object B as the object information 30A with the grid G. In the present embodiment, the presence probability of the object B is represented by values from "0.0" to "1.0". A presence probability of "1.0" represents that the object B exists at the position of that grid G. A presence probability of "0.0" represents that the object B does not exist at the position of that grid G. As the presence probability is closer to "1.0", it is more probable that the object B exists. As the presence probability is closer to "0.0", it is less probable that the object B exists.

Specifically, the object mapping unit 20E correlates a presence probability of "1.0" as the object presence information 30C with the grid G at the position P where the object B is sensed. Moreover, the object mapping unit 20E correlates a presence probability of "0.0" as the object absence information 30D with the grid closer to the sensor 10B than the grid G at the position P where the object B is sensed.

Next, in regard to the grid G with which the object absence information 30O with a presence probability of "0.0" is correlated, the object mapping unit 20E adjusts the presence probability so that the presence probability decreases in a direction to the sensor 10B from the grid G with which the object presence information 30C with a presence probability of "1.0" is correlated.

That is to say, using as a center the grid G at the position P where the object B is sensed, the object mapping unit 20E adjusts the presence probability so that the presence probability decreases as away from the center to the sensor 10B in accordance with a Gauss distribution representing predetermined dispersion.

For example, the object mapping unit 20E correlates the object absence information 30D representing a presence probability of "0.5" with the grid G, among the grids G with which the object absence information 30D is correlated, that is adjacent on the sensor 10B side to the grid G with which the object presence information 30C is correlated. Then, in regard to the grid G with which the object absence information 30D is correlated other than the adjacent grid G, the object mapping unit 20E correlates the object absence information 30D representing a presence probability of "0.0".

In the description below, the object absence information 30D representing a presence probability of "0.0" may be referred to as object absence information 30E. In addition, the object absence information 30D representing a presence probability of "0.5" may be referred to as object absence information 30F (see FIG. 4).

Therefore, the object mapping unit 20E correlates the object presence information 30C representing a presence probability of "1.0" with the grid G at the position P where the object B is sensed. The object mapping unit 20E correlates any of the object absence information 30E representing a presence probability of "0.0" or the object absence information 30F representing a presence probability of "0.5" with the grid G at the position P where the object absence information 30D is derived in the particular space S.

In regard to the grids G constituting the row where the object B is not sensed among the rows of the grids G in the azimuth direction of the laser light L, the of mapping unit 20E does not correlate the observation information 30.

In the above correlation, the object mapping unit 20E generates the object map M1 in which the object presence information 30C, the object absence information 30E, or the object absence information 30F is correlated with each grid G.

In this manner, the object mapping unit 20E can adjust the sensing error of the distance in the sensor 10B by correlating the grid G and the presence probability in accordance with the distance from the sensor 10B as the object information 30A. That is to say, at a position away from the object B by a distance corresponding to the sensing error of the sensor 10B, it may be difficult to determine whether the object B exists because of the sensing error of the sensor 10B. Therefore, in regard to the grids G around the grid G with which the object presence information 30C is correlated among the grids G with which the object absence information 30D is correlated, the object mapping unit 20E preferably correlates the object absence information 30F representing the intermediate presence probability between "0.0" and "1.0" (for example, "0.5") as the object absence information 30D.

Note that the object mapping unit 203 may correlate, in addition to the presence probability of the object B, at least one of binary information representing the presence or absence of the object B, the discrete value such as the number of times of sensing the object B, the presence probability of each of a plurality of different kinds of objects B, and the label or likelihood representing the attribute of the object B as the object information 30A with the grids C in the particular space S.

The object mapping unit 20B may generate the object map M1 using a method different from the aforementioned one. For example, in regard to the grids G in the particular space S, the object mapping unit 205 derives from the observation information 30 the information on the plurality of laser light L passing the corresponding positions P in the actual space R. Then, the object mapping unit 20E may calculate the presence probability of the object B for each grid G on the basis of the information on the plurality of laser light L, and correlate the presence probability with the grids G.

If the sensing information is the camera image, the object mapping unit 20E calculates a formula used for a projective transformation between the photograph surface of the photographing device as the sensor 10B that has obtained the sensing information, and the two-dimensional plane of the particular space S. By performing the projective transformation on the position P of each pixel in the camera image to the two-dimensional plane in the particular space S using the formula, the grid G at the position P may be specified and with this grid G, the object information 30A may be correlated.

Figure 7:
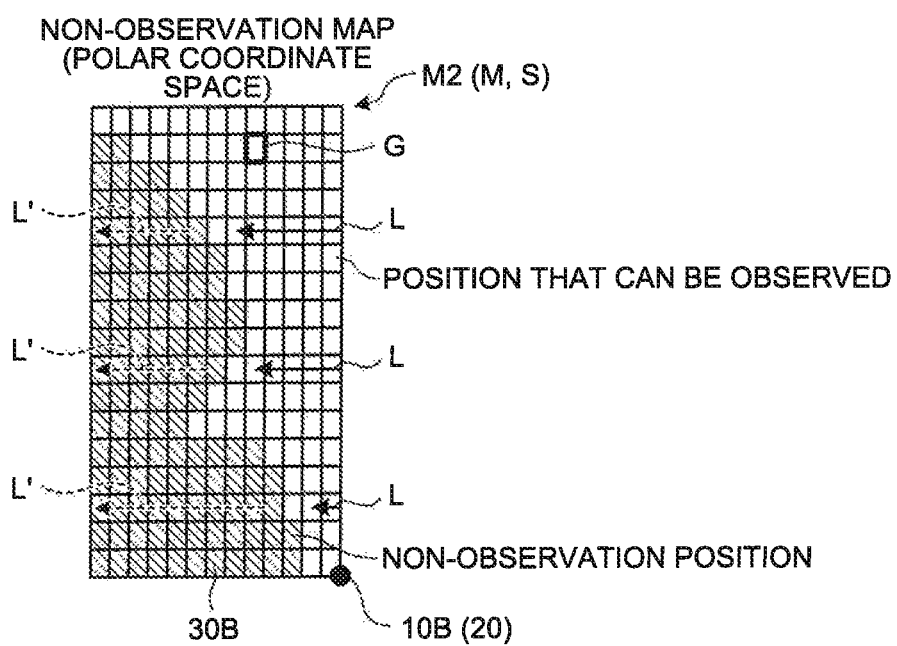
FIG. 7 is an explanatory diagram illustrating one example of a process performed by a non-observation mapping unit.

Next, the non-observation mapping unit 20F is described. FIG. 7 is an explanatory diagram illustrating one example of a process performed by the non-observation mapping unit 20F.

The non-observation mapping unit 20S correlates the non-observation information 30B, which is represented by, the observation information 30 received from the derivation unit 20D, with the corresponding grid G in the particular space S. In other words, the non-observation mapping unit 20F correlates the non-observation informs ion 30B with the grid G at the position P where the non-observation information 30B is derived as the observation information 30 among the positions P where the observation information 30 is derived. By this correlation, the non-observation mapping unit 20F generates a non-observation map M2.

This causes the non-observation information 30B to be correlated with the grid G at the position P where the object B is not observed by the sensor 10B.

The non-observation mapping unit 20F correlates the non-observation information 30B with the grid G for each direction in which the laser light L is delivered by the sensor 10B (azimuth direction), which is similar to the object mapping unit 20I.

Specifically, the non-observation mapping unit 20F specifies the row of grids G where the object B is sensed among the rows of grids G in the azimuth directions of the laser light L from the sensor 10B.

The non-observation mapping unit 20F correlates the non-observation information 30B with the grid G positioned farther from the sensor 10B than the grid G at the position P where the object B is sensed in the grids G constituting the specified row.

Here, as described above, the non-observation information 30B is the information representing that the presence or absence of the object B is unknown. Therefore, for example, the non-observation mapping unit 20F may correlate the grid G and the presence probability representing that whether the presence or absence of the object B is unknown as the non-observation information 30B. In the present embodiment, the non-observation mapping unit 20F correlates the intermediate value of the presence probability "0.5" as the non-observation information 30B with the grid G at the position P where the derivation unit 20D derives the non-observation information 30B.

Note that in a manner similar to the object mapping unit 20E, the non-observation mapping unit 20F may generate the non-observation map M2 using a method different from the aforementioned one.

The non-observation mapping unit 20F may correlate with the grid G, a value other than "0.5", which is more than "0.0" and less than "1.0", as the intermediate value of the presence probability as the non-observation information 30B. In addition, the non-observation mapping unit 20F may correlate, in addition to the presence probability of the object B, other variable as the non-observation information 30B with the grid G.

In this manner, the non-observation mapping unit 20F generates the non-observation map M2.

Back to FIG. 3, the description is continued. Next, the acquisition unit 20O is described. The acquisition unit 20O acquires the map M. In the map M, the object information 30A or the non-observation information 30B on the object B represented by the observation information 30 is correlated with each grid G in the particular space S. Specifically, on the map M, the observation information 30 of any of the object presence information 30C, the object absence information 30E, the object absence information 30F, and the non-observation information 30B is correlated with each grid G in the particular space S.

In the present embodiment, the acquisition unit 20G acquires the object map M1 generated by the object mapping unit 20E and the non-observation map M2 generated by the non-observation mapping unit 20G as the map M. Note that the acquisition unit 20G acquires as the map M, a pair of the object map M1 and the non-observation map M2 that are generated based on the observation information 30 derived from the sensing information sensed at the same sensing timing.

Note that the object mapping unit 20E and the non-observation mapping unit 20F may generate the map M by correlating the object information 30A and the non-observation information 30B with each grid G in one particular space S. That is to say, the object mapping unit 20E and the non-observation mapping unit 20F may directly correlate the object information 30A and the non-observation information 30B with each grid G of the same map M.

In the case in which the particular space S is a two-dimensional space, the map M, may be either a two-dimensional space coinciding with the observation plane of the sensor 10B or a two-dimensional space represented by a two-dimensional plane tilted relative to the observation plane. The map M may include a plurality of kinds of maps M with different resolutions of the grids G.

The acquisition unit 20G outputs the acquired map M to the correction unit 20H.

For each grid G in the map M, the correction unit 20H corrects the correlation of the observation information 30 by using a learned model on the basis of the observation information 30 correlated with other peripheral grids G.

The correction of the correlation of the observation information 30 refers to the correction of the observation information 30 correlated with the grid G in the map M to another observation information 30 as illustrated in FIG. 4. For example, it is assumed that the non-observation information 30B is correlated as the observation information 30 with a certain grid G. In this case, correcting the correlation means that the object presence information 30C, the object absence information 30E, or the object absence information 30F is correlated with the grid G instead of the non-observation information 30B.

The learned model is a model used in a correction process performed by the correction unit 20H. In the present embodiment, for each grid G in the map M, the learned model corrects the correlation of the observation information 30 on the basis of the observation information 30 correlated with other peripheral grids G. In the map M, as described above, the observation information 30 representing the object information 30A on the object B or the observation information 30 representing the non-observation information 30B on the non-observation of the object is correlated with each grid G in the particular space S.

In the present embodiment, the processing unit 20A generates the learned model in advance.

For example, the processing unit 20A prepares a plurality of pairs of a map M (referred to as a first map) before the correction, in which the observation information 30 is correlated with each grid G, and a map M (referred to as a second map) after at least a part of the correlation of the observation information 30 is corrected. Then, the processing unit 20A learns parameters of the model in advance for the input of the first map and the output of the second map. By this learning, the processing unit 20A generates the learned model in which the learned parameters are set.

The processing unit 20A uses, for example, a convolutional neural network (CNN) as a model.

The first map is the map in which the observation information 30 of any of the object information 30A (object presence information 30C, object absence information 30E, or object absence information 30F) and the non-observation information 30B is correlated with each grid G. The second map is the map in which the object information 30A is correlated with the grid G at the positions of at least a part of the grids G with which the non-observation information 30B is correlated in the first map constituting the pair.

Note that the second map is preferably the map in which the object presence information 30C as the object information 30A is correlated with the grid G at the positions of at least a part of the grids G with which the non-observation information 30B is correlated in the first map constituting the pair.

For example, the sensing information in time series of the sensor 10B is held in advance, and the map in which the object information 30A or the non-observation information 30B on the basis of the sensing information sensed by the sensor 10B at a single sensing timing is correlated with each grid G is used as the first map. As the second map, the map in which the object information 30A or the non-observation information 30B on the basis of the sensing information sensed by the sensor 10B at a plurality of sensing timings is correlated with each grid G is used. Specifically, the processing unit 20A correlates the object information 30A or the non-observation information 30B with the second map on the basis of the sensing information at the sensing timing before and after the sensing timing of the first map.

Note that the processing unit 20A may use the map in which the sensing information till a certain time is correlated as the first map, and use the map in which the sensing information after that time is additionally correlated as the second map. Furthermore, the processing unit 20A may use the map in which the sensing information of a certain sensor 10B is correlated as the first map, and use the map in which the sensing information of another sensor 10B is correlated as the second map.

Figure 8:
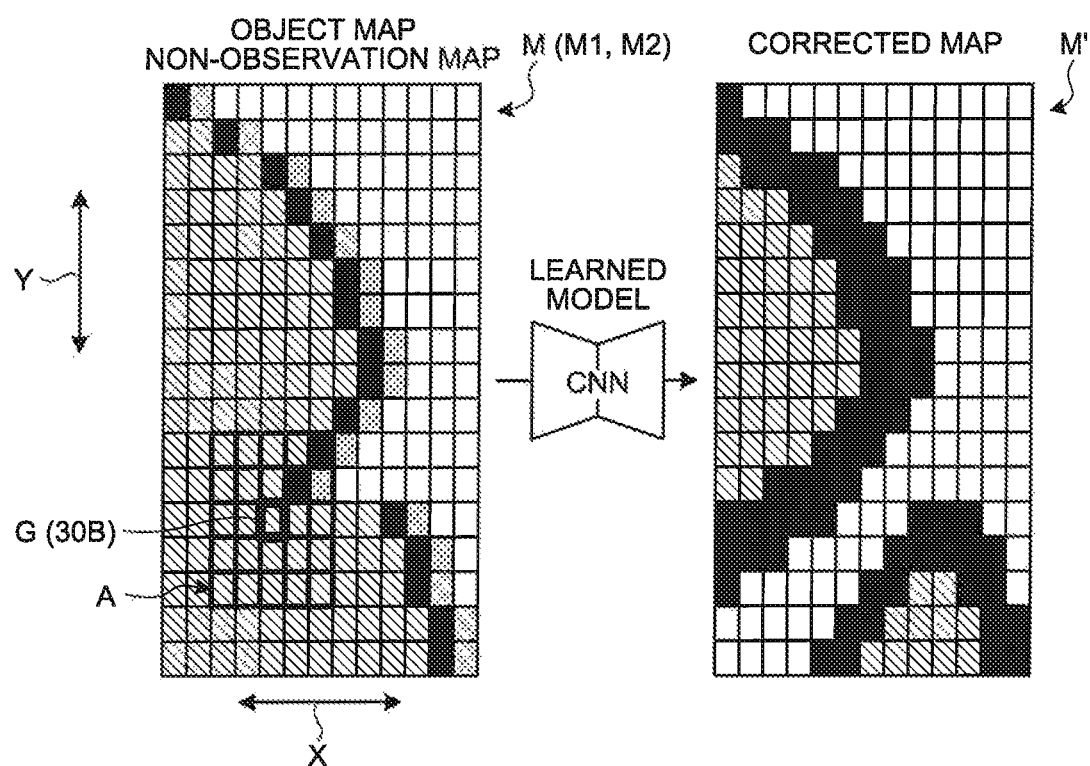
FIG. 8 is an explanatory diagram illustrating one example in which a correction unit corrects correlation.

FIG. 8 is an explanatory diagram illustrating one example in which the correction unit 20H corrects the correlation.

As described above, for each grid G in the map M to be corrected, the correction unit 20H corrects the correlation of the observation information 30 for the grid G by using the learned model on the basis of the observation information 30 correlated with other peripheral grids G.

Other peripheral grids G include other grids G disposed adjacently in the periphery of the grid G to be corrected in the map M. The grid G disposed adjacently in the periphery of the grid G to be corrected corresponds to the grid G disposed in contact with (adjacent to) the grid G to be corrected.

Note that other peripheral grids G include at least other grids G disposed adjacently in the periphery of the grid G to be corrected. Therefore, other peripheral grids G may include a plurality of other grids G arrayed successively in a direction away from the grid G adjacent to the grid G to be corrected.

For example, the correction unit 20H inputs to the learned model, the map M in which the observation information 30 (any of object presence information 30C, object absence information 30E, object absence information 30F, and non-observation information 30B) is correlated with each of the grids G. By the input to this learned model, for each grid G, the correction unit 20H derives the corrected observation information 30 (i.e., presence probability) in which the observation information of other peripheral grids G is considered.

For example, it is assumed that, as the observation information 30, the presence probability representing the object presence information 30C, the object absence information 30E, the object absence information 30F, or the non-observation information 30B is correlated with each of the grids G in the map M.

In this case, the correction unit 20H inputs the presence probability correlated with each grid G as the map M in the learned model. By the input to the learned model, the correction unit 20H derives a corrected map M' in which the presence probability after the correction is correlated with each grid G.

By the process described above, in regard to at least the grid G with which the non-observation information 30B in the map M is correlated, the correction unit 20H corrects the correlation of the observation information 30 on the basis of the observation information 30 of other peripheral grids G and the learned model. That is to say, the correction unit 20H corrects the correlation of at least the grid G with which the non-observation information 30B is correlated in the map M.

Therefore, in the map M before the correction, the correction unit 203 can correct the correlation so that the presence probability representing the observation information 30 other than the non-observation information 30B (object information 30A (object presence information 30C, object absence information 30D (object absence information 30E, object absence information 30F))) is newly correlated with at least a part of the grids G with which the non-observation information 30B is correlated.

Furthermore, by correcting the correlation using the learned model, the correction unit 20H can correct the correlation of the observation information 30 with the grid G in accordance with the result estimated from the distribution of the pair of the first map and the second map in the past.

As described above, in the present embodiment, the intermediate value of the presence probability "0.5" is correlated with the grid G as the non-observation information 30B in the map M before the correction.

Therefore, the correction unit 20H can correlate the object information 30A representing the presence or absence of the object B (object presence information 30C, object absence information 30E) with the grid G at the position P where the presence of the object B can be estimated in the map M. The correction unit 20H can correct the correlation so that the object absence information 30F representing that the presence or absence of the object B is uncertain can be correlated with the grid G at the position P where the presence of the object B cannot be predicted.

Note that the correction unit 20H may also correct the correlation of the grid G with which the object information 30A is correlated in the map M. That is to say, in regard to the grid G with which the object information 30A is correlated in the map M, the correction unit 20H corrects the correlation of the observation information 30 by using the learned model on the basis of the observation information 30 of other peripheral grids G.

In this case, the correction unit 20H preferably corrects the correlation of the observation information 30 while changing the parameter of the learned model so that the correction of the correlation of the grid G with which the object information 30A is correlated is suppressed as compared with the correction of the correlation of the grid G with which the non-observation information 30B is correlated.

For example, the difference between the presence probability before the correction and the presence probability after the correction is referred to as a correction amount. In this case, the correction unit 20H may correct the presence probability so that the correction amount of the grid G with which the object information 30A is correlated is smaller than that of the grid G with which the non-observation information 30B is correlated. The correction unit 20H may skip the correction of the correlation of the grid G with which the object information 30A is correlated.

Back to FIG. 3, the description is continued. Next, the output control unit 20I is described. The output control unit 20I outputs the output information to at least one of the output unit 10A and the driving control unit 10G.

The output information is the information representing the map M after being corrected by the correction unit 20H. For example, the output information is the map M after being corrected by the correction unit 20H.

For example, the output control unit 20I outputs the output information to the output unit 10A. Having received the output information, the communication unit 10D of the output unit 10A transmits the output information to the external device or the like. For example, the display 10E of the output unit 10A displays the output information. In another example, the speaker 10E of the output unit 10A outputs a sound in accordance with the output information. The sound in accordance with the output information may be a voice representing the output information or a warning sound in accordance with the output information.

For example, the output control unit 20I outputs the output information to the driving control unit 10G. As described above, the driving control unit 10G controls the driving unit 10H of the moving body 10. The driving control unit 10G having received the output information determines the peripheral circumstances on the basis of the output information, the information obtained from the sensor 10B, and the like, and controls the accelerating amount, the braking amount, the steering angle, and the like. For example, the driving control unit 10G controls the vehicle so that the vehicle travels in the current lane avoiding the obstacle and keeps a predetermined distance or more from the preceding vehicle.

Specifically, the driving control unit 10G controls the driving unit 10H using the corrected map M. That is to say, the driving control unit 10G controls the driving unit 10H using the corrected map M also in regard to the position where the detection information of the sensor 10B does not clarify the presence or absence of the object B.

For example, the driving control unit 10G controls the speed of the moving body 10 using the corrected map M. Specifically, the driving control unit 10G performs controls so that a dangerous region is specified from the corrected map M and the speed of the moving body 10 is decreased when the moving body 10 travels near that dangerous region. The dangerous region is, for example, a region in which the object B may exist in a blind area.

For example, in a case in which the grid G with which the object information 30A is correlated exists in a region in which the plurality of grids G with which the non-observation information 30S is correlated are successively disposed in the corrected map M, the driving control unit 10G specifies the region including the grid G with which the object information 30A is correlated, as the dangerous region. In another example, in a case in which the grid G with which the attribute representing the road or the space is correlated exists in a region in which a predetermined number or more of grids G with which the non-observation information 30B is correlated are successively disposed, the driving control unit 10G specifies the region including the grid G with which the attribute is correlated, as the dangerous region.

By such a control, the driving control unit 10G can achieve the safe travel of the moving body 10.

Note that the output control unit 20I may cause the storage unit 20B to store the output information. The output control unit 20I may output the output information to another processing functional unit (for example, the function to determine the collision or predict the movement).

Figure 9:
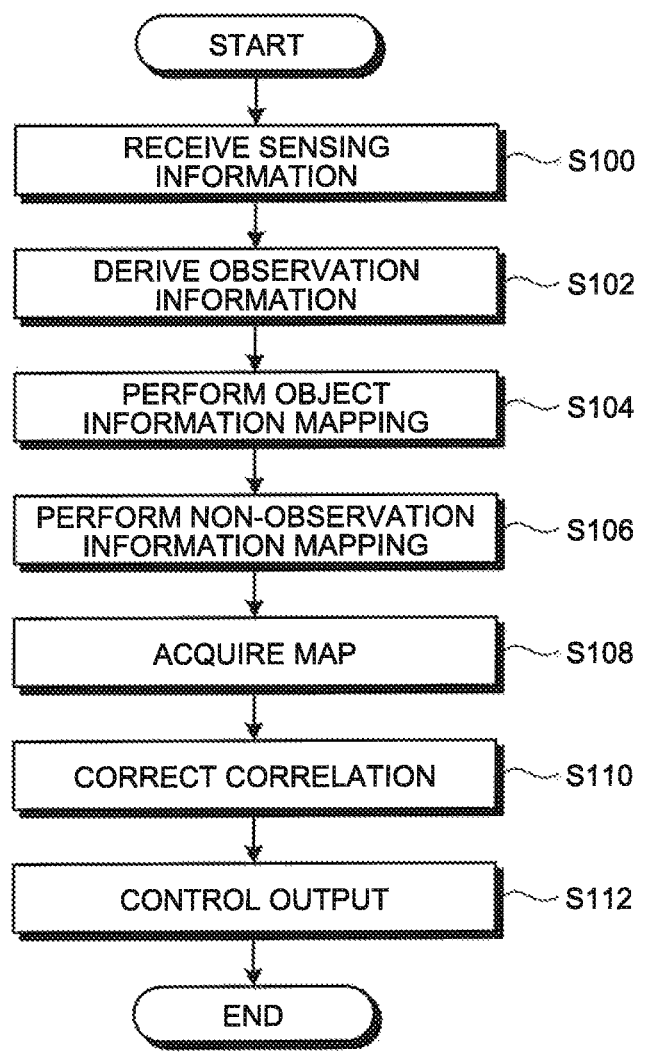
FIG. 9 is a flowchart illustrating one example of a procedure of information processing.

Next, one example of a procedure of the information processing performed by the processing unit 20A is described. FIG. 9 is a flowchart of one example of the procedure of the information processing performed by the processing unit 20A.

First, the reception unit 20C receives the sensing information from the sensor 10B (step S100). Next, from the sensing information received in step S100, the derivation unit 20D derives the observation information 30 at each position P in the actual space R (step S102).

Next, the object mapping unit 20E correlates the object information 30A with each grid G (performs mapping) (step S104). At step S104, the object mapping unit 20E correlates the object information 30A with the grid G at the position P where the object information 30A (object presence information 30C or object absence information 30D) is derived as the observation information 30 among the positions P where the observation information 30 is derived at step S102. By the process at step S104, the object map M1 is generated.

Next, the non-observation mapping unit 20F correlates the non-observation information 30B (performs mapping) (step S106). At step S106, the non-observation mapping unit 20F correlates the non-observation information 30B with the grid G at the position P where the non-observation information 30B is derived as the observation information 30 among the positions P where the observation information 30 is derived at step S102. By the process in step S106, the non-observation map M2 is generated.

Next, the acquisition unit 20G acquires the object map M1 generated at step S104 and the non-observation map M2 generated at step S106 as the map M (step S108).

Next, for each grid G in the map M acquired at step S108, the correction unit 20H corrects the correlation of the observation information 30 by using the learned model on the basis of the observation information 30 correlated with other peripheral grids G (step S110).

Next, the output control unit 20I performs the output control to output the map M after being corrected at step S110 to the output unit 10A and the driving control unit 10G (step S112). Then, the present routine ends.

As described above, the information processing device 20 according to the present embodiment includes the acquisition unit 20G and the correction unit 20H. The acquisition unit 20G acquires the map M. In the map M, the observation information 30 representing the object information 30A on the object B or the observation information 30 representing the non-observation information 30B on the non-observation of the object is correlated with each grid G in the particular space S. For each grid G, the correction unit 20H corrects the correlation of the observation information 30 by using the learned model on the basis of the observation information 30 correlated with other peripheral grids G.

In this manner, for each grid G included in the map M, the information processing device 20 according to the present embodiment corrects the correlation of the observation information 30 on the basis of the observation information 30 correlated with other peripheral grids G and the learned model. Therefore, in regard to the grid G with which the observation information 30 representing the non-observation information 30B on the non-observation of the object is correlated, the correlation of the observation information 30 can be corrected by using the learned model on the basis of the observation information 30 correlated with other peripheral grids G.

Here, conventionally, it has been difficult to accurately estimate the object at the non-observation position when the result of tracking other vehicle is not used or in regard to the object that has never been observed before. The non-observation position corresponds to the position where the laser light L from the sensor 10S does not reach and the sensing by the sensor 10S is impossible. That is to say, the non-observation position is the position where the presence or absence of the object B is unknown.

On the other hand, in regard to the grid G with which the observation information 30 representing the non-observation information 30B on the non-observation of the object is correlated, the information processing device 20 according to the present embodiment can correct the correlation of the observation information 30 by using the learned model and the observation information 30 correlated with other peripheral grids G.

Therefore, in regard to the grid G at the non-observation position where the presence or absence of the object B is unknown, the information processing device 20 according to the present embodiment can perform the correction so that the object information 30A or the non-observation information 30B is correlated by using the observation information 30 correlated with other peripheral grids G or the learned model.

Therefore, the information processing device 20 according to the present embodiment can accurately predict the object B at the non-observation position.

Further, since the information processing device 20 according to the present embodiment can obtain the corrected map M, in addition to the advantageous effect, the efficient information that can be used in the prediction of a collision risk in a blind region or the early control can be provided.

In the present embodiment, moreover, the driving control unit 10G controls the driving unit 10H by using the corrected map M.

Here, in a case in which the driving control unit 10G controls the driving of the driving unit 10H without using the corrected map M, it has been difficult to secure the safety of the travel of the moving body 10 before the moving body 10 travels to the position where the object B, which has not been sensed by the sensor 10S, can be sensed.

On the other hand, the driving control unit 10G of the information processing device 20 according to the present embodiment controls the driving unit 10H by using the corrected map M as the output information. Therefore, the information processing device 20 according to the present embodiment can secure the safety of the travel of the moving body 10 because the risk can be avoided earlier.

Based on the corrected map M, the output control unit 20I may generate the travel route that enables the moving body 10 to avoid the obstacle existing in a blind area or to smoothly travel on the road existing in the blind area. Then, the output control unit 20I may output the generated travel route to the driving control unit 10G as the output information. In this case, the driving control unit 10G may control the driving unit 10H so that the moving body 10 travels autonomously along the travel route.

The output control unit 20I may predict the moving route of other moving body on the basis of the corrected map M. Then, the output control unit 20I may output the predicted prediction moving route to the driving control unit 10G as the output information. In this case, the driving control unit 10G may control the driving unit 10H on the basis of the prediction moving route so that the moving body 10 travels on the travel route avoiding the collision with other moving body.

Note that the present embodiment has described the example in which the correction unit 20H outputs to the output control unit 20I, the map M in which the correlation of the observation information 30 is correct d with each of the grids G included in the map M received from the acquisition unit 20G.

However, for each grid G to be corrected, the correction unit 20H may correct the correlation of the grid G to be corrected, by using the local map M in which other peripheral grids G are extracted. The correction unit 20H may alternatively correct, for each grid G in the map M, the correlation in the order from the grid G disposed near the sensor 10B to the grid G disposed at the far position.

Note that the present embodiment has described the example in which the learned CNN is used as the learned model. However, other model than CNN may be used as the learned model.

For example, the correction unit 20H prepares a plurality of pairs of a first map and a second map, each map showing a local region, as a dictionary. Then, the correction unit 20H selects from the dictionary, the pair that is the most similar to the local region extracted from the map M to be corrected. Then, the correction unit 20H may correct the correlation by overlapping the selected pair of the first map and the second map on the map M to be corrected.

The correction unit 20H may use the region in a certain range as the local region, or may use the region in a different range depending on the position in the map M to be corrected.

The correction unit 20H may correct the correlation of the observation information 30 by approximating the grid G with which the object presence information 30C is correlated in the map M to be corrected into a structure such as a line, and by extending the structure to the grid G with which the non-observation information 30B is correlated in the map M.

For each grid G with which the non-observation information 30B is correlated in the map M to be corrected, the correlation may be corrected by using the object information 30A of the grid G with which the object presence information 30C is correlated at the closest position.

First Modification

As described above, the coordinate system of the particular space S is a polar coordinate system, and in the map M, the observation information 30 is correlated with the grids G of the polar coordinate space. However, a rectangular coordinate system may be employed instead of the polar coordinate system of the particular space S.

In this case, the coordinate system of the map M coincides with the coordinate system of the actual space R. For example, by using the sensor 10B (information processing device 20) as the origin, the map M is represented by the rectangular coordinate whose coordinate axes are the traveling direction of the moving body 10 including the sensor 10B and the direction orthogonal to the traveling direction.

In this case, the correction unit 20H or the output control unit 20I may convert the corrected map M from the polar coordinate system to the rectangular coordinate system, and output the converted map M.

Alternatively, the object map M1 and the non-observation map M2 of the rectangular coordinate system may be generated by having the object mapping unit 20E and the non-observation mapping unit 20F correlate the observation information 30 with the particular space S of the rectangular coordinate system.

In this case, the object mapping unit 20E converts the position P in the actual space R represented by the azimuth and the distance from the sensor 10B, into the position P represented by the rectangular coordinate system. That is to say, the object mapping unit 20E converts the position P, which is represented by the azimuth and the distance from the sensor 10B, into the position P represented by the distance in the traveling direction using the sensor 10B as the origin and the distance in the direction orthogonal to the traveling direction. Then, with the grid G at the position P after the conversion, that is, the grid G in the map M represented by the rectangular coordinate system, the object mapping unit 20E correlates the object information 30A at the corresponding position P before the conversion.

The object mapping unit 20E may correlate the presence probability as the object absence information 30D in consideration of the sensing error of the sensor 10B. Specifically, by using the grid G, which is at the position P where the object B is sensed in the particular space S of the rectangular coordinate system (i.e., the rectangular coordinate space), as a center, the object mapping unit 20E may correlate the presence probability so that the presence probability decreases as away from the grid G as the center.

Note that if the sensor 10B is a LIDAR, the conversion from the polar coordinate system to the rectangular coordinate system as described above is necessary; however, if the sensor 10B acquires the sensing information of the rectangular coordinate space such as the camera image, the above conversion is unnecessary.

The object mapping unit 20E may similarly correlate the non-observation information 30B with the grid G at the position P where the non-observation information 30B is derived in the map M represented by the rectangular coordinate system.

Then, in a manner similar to the above embodiment, the correction unit 20H may correct, for each grid G in the map M to be corrected, the correlation of the observation information 30 with the grid G on the basis of the observation information 30 correlated with other peripheral grids G and the learned model.

In the above embodiment, the map M represented by the polar coordinate system is used. Therefore, in the above embodiment, when the same number of grids G are used as other peripheral grids G between the grids G in the map M, the peripheral region used in the correction of the grid G away from the sensor 10B by a predetermined distance or more in the actual space R has a different size.

On the other hand, in the present modification, the map M represented by the rectangular coordinate system is used. Therefore, the correction unit 20H can perform the correction using, the regions with the same size in the actual space R as other peripheral grids G not depending on the distance from the sensor 10B.

In the present modification, the map M in the rectangular coordinate system is used; therefore, the driving control unit 100 can perform the control while correlating the driving of the moving body 10 and the position in the map M easily.

Second Modification

As described above, in the above embodiment, the correction unit 20H performs the process on the map M based on the sensing information sensed by the sensor 10B at a single sensing timing. However, the correction unit 20H may alternatively perform the process on the map M in which the sensing information at a plurality of sensing timings is correlated.

In the present modification, the acquisition unit 20G acquires the map M including the object map M1 and the non-observation map M2 that are generated based on the observation information 30 derived from the sensing information sensed at the same sensing timing. The acquisition unit 20G integrates the maps M that are sequentially generated in accordance with the sensing information received in time series, specifically integrates every two maps M into one map M along the time series, and then outputs the one map M to the correction unit 20H.

For example, the acquisition unit 20G integrates, with the map M generated at a certain timing (timing A), the object information 30A correlated with the grid G in the map M generated at the next timing (timing B).

Note that with each grid G in the map M generated at the timing A, the object information 30A or the non-observation information 30B is already correlated by the object mapping unit 20E or the non-observation mapping unit 20F. Therefore, along the time change by the movement of the moving body 10 or the movement of the peripheral object B that can occur between the timing A and the timing B, contradiction may occur between the observation information 30 correlated with the grid G at the timing A and the observation information 30 correlated with the grid G at the timing B.

Therefore, the acquisition unit 20G correlates with the grid G in the map M generated at the timing A, the observation information 30 in consideration of the observation information 30 correlated with each grid G in the map M generated at the timing A and the observation information 30 correlated with each grid G in the map M generated at the timing B. This process enables the acquisition unit 20G to integrate these maps M into one.

Specifically, the acquisition unit 20G correlates the object information 30A with the grid G with which the object information 30A is correlated, at the corresponding position in the map M at the timing B among the grids G with which the non-observation information 30B is correlated in the map M at the timing A.

The acquisition unit 20G holds the object information 30A as the prior probability in regard to the grid G with which the object information 30A is correlated in the map M at the timing A. Then, the acquisition unit 20G calculates the posterior probability by using the observation information 30 correlated with the grid G at the corresponding position in the map M at the timing B. Then, the acquisition unit 20G correlates the posterior probability with the corresponding grid G in the map M at the timing A.

The maps M may be integrated in a manner that the non-observation information 30B is correlated with the grid G with which the observation information 30 is not correlated, without changing the observation information 30 in the grid G with which the observation information 30 is correlated in the map M at the timing A.

Then, the acquisition unit 20G outputs the one map M, in which the two maps M are integrated, to the correction unit 20H.

In the present modification, the maps M that are generated sequentially in accordance with the sensing information received in time series are integrated, specifically every two maps M are integrated into one map M along the time series, and the one map M is output to the correction unit 20H. However, the acquisition unit 20G may integrate every three maps M along the time series into one map M and output the one map M to the correction unit 20H.

The acquisition unit 20G may derive the correlation between the position of the grid G in the map M at the timing A and the position of the grid G in the map M at the timing B from the moving status of the moving body 10, or may estimate the correlation by specifying the position of the same object B included in these two maps M.

The moving body 10 may include two sensors 10B. In this case, the acquisition unit 20G may integrate two maps N generated based on two pieces of detection information detected by the two sensors 10B at the same timing into one map M.

In the above embodiment, the sensing information at a single sensing timing is correlated with the map M. Therefore, in the above embodiment, only the observation information 30 that can be observed from a certain position is correlated with the map M.

In the present modification, however, the sensing information at the plural sensing timings can be correlated with the map M. Therefore, in the present modification, the observation information 30 that can be observed at the different positions can be correlated. In addition, in the present modification, when the correction unit 20H performs the correction, the correlation can be corrected based on more pieces of observation information 30. Therefore, in the present modification, the object at the non-observation position can be estimated more accurately.

Second Embodiment

Next, description is made of an embodiment in which the parameter of the learned model is updated.

Figure 10:
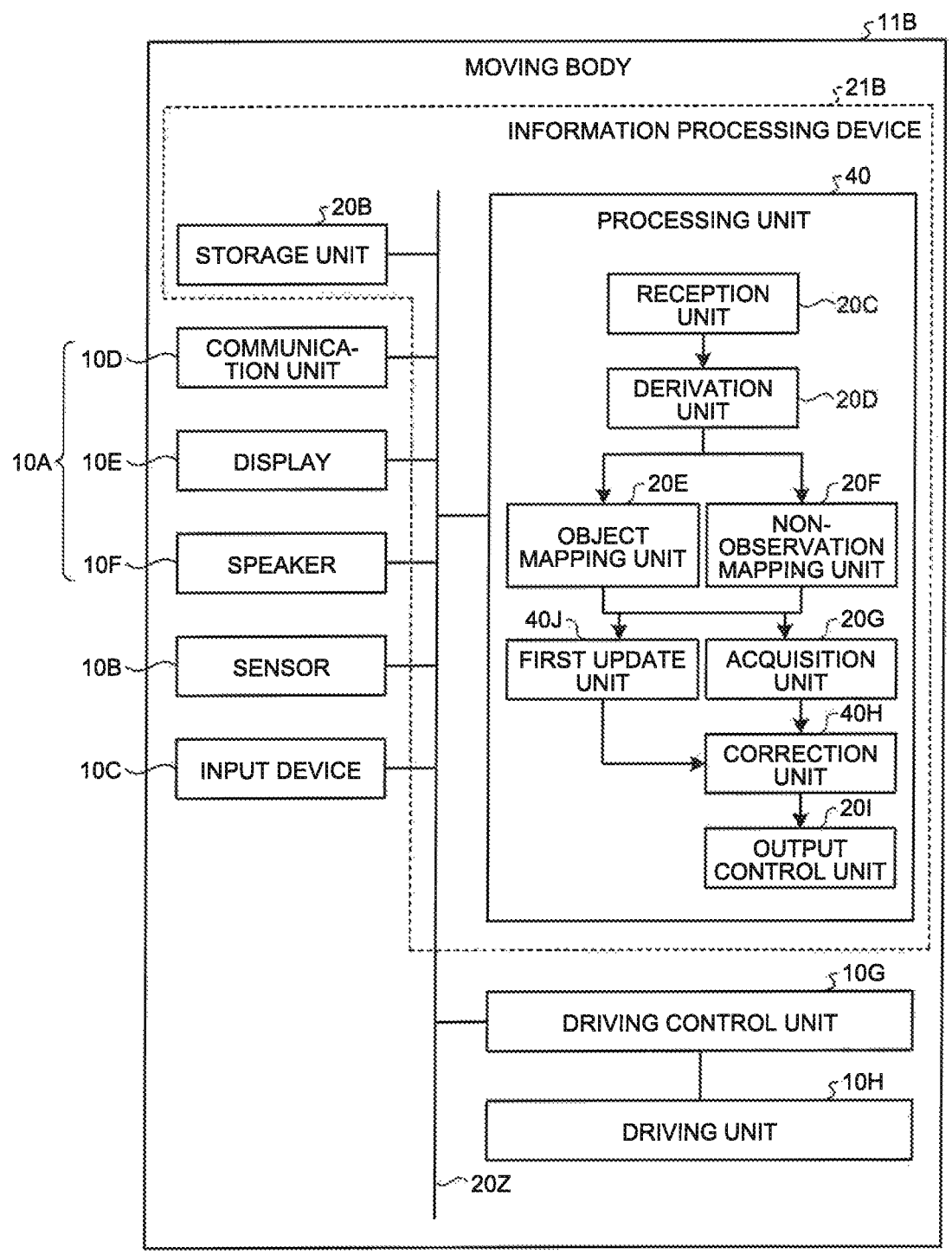
FIG. 10 is a block diagram illustrating one example of a moving body.

FIG. 10 is a block diagram illustrating one example of a moving body 11B including an information processing device 21B. The moving body 11B is similar to the moving body 10 in the first embodiment except that the moving body 11B includes the information processing device 21B instead of the information processing device 20.

The information processing device 21B includes a processing unit 40 and a storage unit 20B. The information processing device 21B includes the processing unit 40 instead of the processing unit 20A.

The processing unit 40 includes the reception unit 20C, the derivation unit 20D, the object mapping unit 20E, the non-observation mapping unit 20F, the acquisition unit 20G, a correction unit 40H, the output control unit 20I, and a first update unit 40J.

The processing unit 40 is similar to the processing unit 20A in the first embodiment except that the processing unit 40 includes the correction unit 40H instead of the correction unit 20H and further includes the first update unit 40J.

The correction unit 40H is similar to the correction unit 20H in the first embodiment except that the correction unit 40H uses a learned model with a parameter updated bye the first update unit 40J to correct the correlation.

The first update unit 40J updates the parameter of the learned model on the basis of a plurality of maps M derived from a plurality of pieces of observation information 30 at different timings.

The plurality of pieces of observation information 30 at different timings is the observation information 30 at different timings that is derived from a plurality of pieces of sensing information sensed at different timings by the derivation unit 20D.

The plurality of maps M derived from the plurality of pieces of observation information 30 at different timings are a plurality of pairs of the object map M1 and the non-observation map M2, each pair being generated by the object mapping unit 20E and the non-observation mapping unit 20F at each timing on the basis of the observation information 30 at each timing.

The first update unit 40J acquires the maps M sequentially from the object mapping unit 20S and the non-observation mapping unit 20F. That is to say, the first update unit 40J sequentially acquires as the maps M, the object map M1 generated by the object mapping unit 20E and the non-observation map M2 generated by the non-observation mapping unit 20F. This enables the first update unit 40J to obtain the plural maps M generated based on each of a plurality of pieces of sensing information sensed at different timings.

Then, the first update unit 40J updates the parameter of the learned model by using the two maps M in which the sensing timings of the sensing information used in the generation are different. Here, in this description, the map M generated based on the sensing information sensed at a first timing is a map M at the first timing. A timing after the first timing is a second timing. The map M generated based on the sensing information sensed at the second timing is a map M at the second timing.

Then, among the grids G with which the non-observation information 30B is correlated in the map M at the first timing, the first update unit 40J specifies the grid G with which the object information 30A is correlated in the map M at the second timing.

Note that the positions of the grids G between the map M at the first timing and the map M at the second timing may be correlated with each other as follows. For example, the first update unit 40J estimates the movement of the moving body 10 between the two timings, and based on the map M at the first timing, calculates the corresponding position in the map M at the second timing. The first update unit 40J performs this calculation for all the grids G in the map M.

Then, for each grid G in the map M at the first timing, the first update unit 40J derives the parameter for correcting the correlation of the observation information 30 from the observation information 30 correlated with other peripheral grids G to the observation information 30 correlated with the grid G at the corresponding position in the map M at the second timing.

Then the first update unit 40J updates the parameter of the learned model used in the correction unit 40H to the derived parameter, and outputs the updated parameter to the correction unit 40H.

If the parameter is updated by the first update unit 40J, the correction unit 40H corrects the correlation of the observation information 30 by using the learned model including the updated parameter, in a manner similar to the correction unit 20H in the first embodiment.

Note that the first update unit 40J may output the difference between the parameter before the update and the parameter after the update that is derived newly, to the correction unit 40H. In this case, the correction unit 40H may update the parameter of the learned model by using the received difference, and then use the updated parameter to correct the correlation of the observation information 30.

Note that the first update unit 40J may use one map M or a plurality of maps M as the map M at the second timing. The plurality of maps M at the second timing may be specifically the maps M which are sensed at the timings different from the first timing and generated based on a-plurality of pieces of sensing information sensed at timings different from each other. In the case of using the maps H at the second timing, the first update unit 40J may perform the process after integrating the maps M at the second tithing into one map M.

The first update unit 40J may derive the parameter of the learned model by using a plurality of pairs of the map M at the first timing and the map M at the second timing.

Next, one example of the procedure of the information processing performed by the processing unit 40 is described.

The processing unit 40 performs a process similar to the process performed by the processing unit 20A in the first embodiment (see FIG. 9). However, the processing unit 40 performs an interrupting process illustrated in FIG. 11.

Figure 11:
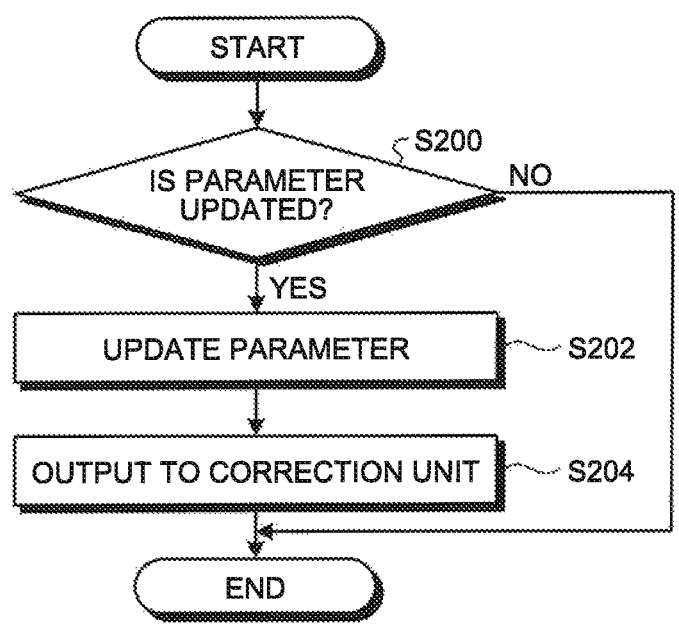
FIG. 11 is a flowchart illustrating one example of a procedure of an interrupting process.

FIG. 11 is a flowchart illustrating one example of the procedure of the interrupting process performed by the processing unit 40. The processing unit 40 performs the interrupting process illustrated in FIG. 11 while the information processing is performed according to the procedure in FIG. 9.

First, the first update unit 40J determines whether to update the parameter of the learned model (step S200). If it is determined the parameter is not updated at step S200 (No at step S200), the present routine ends. If it is determined the parameter is updated at step S200 (Yes at step S200), the process advances to step S202.

At step S202, the first update unit 40J updates the parameter of the learned model by using the map M at the first timing and the map M at the second timing (step S202).

Next, the first update unit 40J outputs the learned model with the updated parameter to the correction unit 403 (step S204). Having received the learned model with the updated parameter, the correction unit 40H corrects the correlation of the observation information 30 for each of the grids G in the map M by using the received learned model. Then, the present routine ends.

As described above, in the information processing device 21B according to the present embodiment, the first update unit 40J updates the parameter of the learned model on the basis of the maps M derived from the pieces of observation information 30 at different timings.

Here, if the parameter of the learned model is not updated and the environment shown in the map M used to generate the learned model and the environment in the actual correction are largely different, the correction accuracy of the correlation may deteriorate. On the other hand, in the information processing device 21B according to the present embodiment, the first update unit 40J updates the parameter of the learned model on the basis of the maps M derived from the pieces of observation information 30 at different timings.

Therefore, the information processing device 21B according to the present embodiment can correct the correlation that is suitable to the environment in the correction.

Therefore, in the information processing device 21B according to the present embodiment, the object B at the non-observation position can be estimated more accurately in addition to the effect of the first embodiment.

Third Embodiment

The present embodiment will describe an example in which a plurality of correction units are provided.

Figure 12:
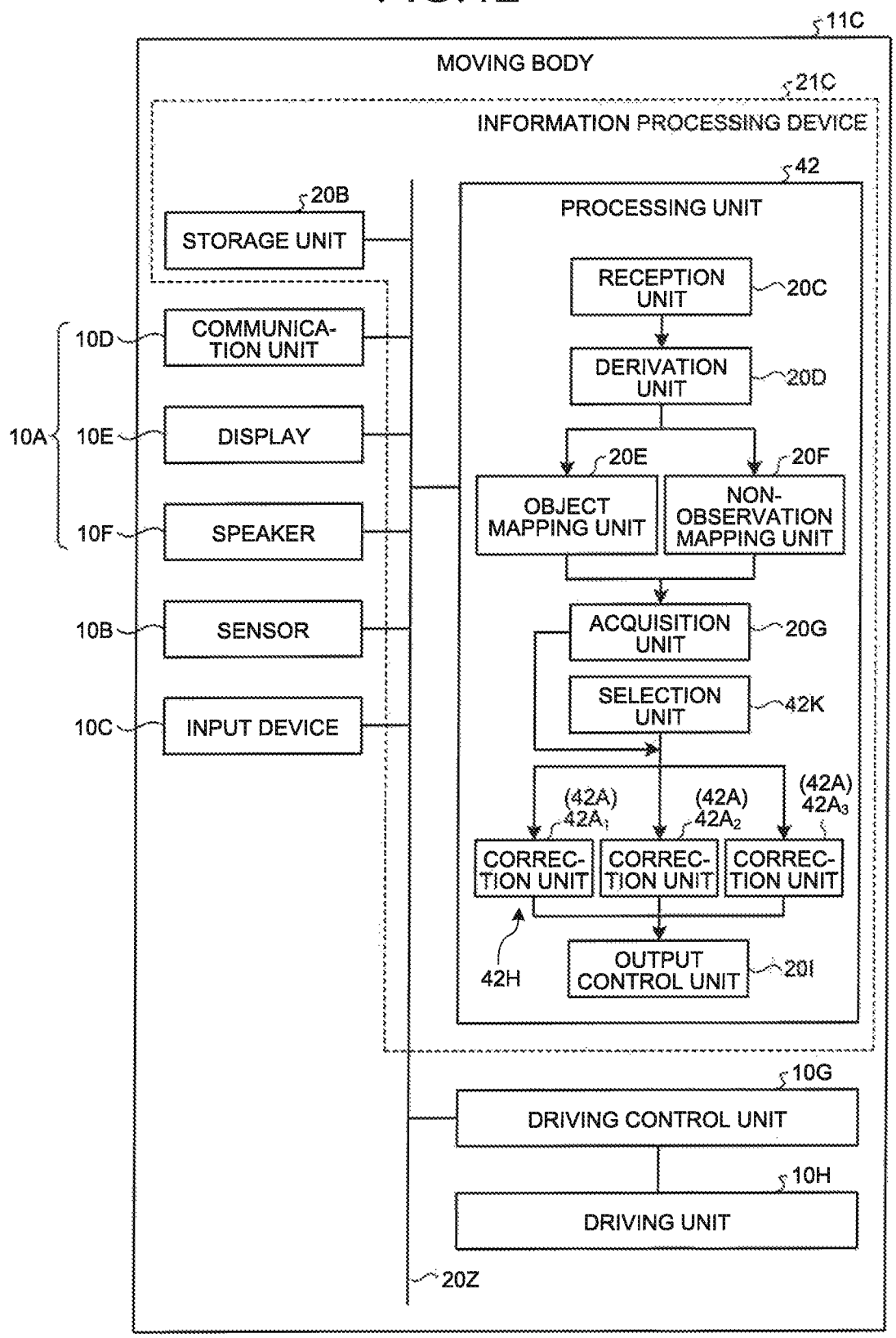
FIG. 12 is a block diagram illustrating one example of a moving body.

FIG. 12 is a block diagram illustrating one example of a moving body 11C including an information processing device 21C. Note that the moving body 11C is similar to the moving body 10 according to the first embodiment except that the moving body 11C includes the information processing device 21C instead of the information processing device 20.

The information processing device 21C includes a processing unit 42 and the storage unit 20B. The information processing device 21C includes the processing unit 42 instead of the processing unit 20A.

The processing unit 42 includes the reception unit 20C, the derivation unit 20D, the object mapping unit 20E, the non-observation mapping unit 20F, the acquisition unit 20G, a selection unit 42K, a correction unit 42H, and the output control unit 20I.

The processing unit 42 is similar to the processing unit 20A in the first embodiment except that the processing unit 42 includes the correction unit 42E instead of the correction unit 20H, and further includes the selection unit 42K.

The correction unit 42H includes a plurality of correction units 42A. In the present embodiment, the correction unit 42H includes three correction units 42A (correction units $42A_1$ to $42A_3$). It is only necessary that the correction unit 42H includes a plurality of correction units 42A (correction units $42A_1$ to $42A_3$), and the correction unit 42H is not limited to the mode of including the three correction units 42A.

The correction units 42A are similar to the correction unit 20H according to the first embodiment. However, the correction units 42A correct the correlation using learned models with different parameters. That is to say, in the correction units 42A, the learned models with the different parameters are set in advance.

The selection unit 42K selects the correction unit 42A to correct the correlation of the observation information 30 on the basis of selection information. Specifically, the selection unit 42K selects one correction unit 42A that corrects the correlation of the observation information 30 among the correction units 42A (correction units $42A_1$ to $42A_3$).

The selection unit 42K receives the selection information. For example, the selection unit 42K receives the selection information from at least one of the external device, the sensor 10B, and the driving control unit 10G through the input device 10C and the communication unit 10D.

Then, the selection unit 42K selects one correction unit 42A among the correction units 42A (correction units $42A_1$ to $42A_3$) in accordance with the selection information.

The selection information is the information used to determine which one of the correction units 42A is selected. Specifically, the selection information is the information representing the selection condition such as the ambient environment, the weather, the period of time, the travel state, or the user's preference. These selection conditions are represented by the information detected by the sensor 10B, the driving state such as the vehicle speed or the acceleration of the moving body 11C, and the use status of a device such as a wiper, a headlight, or an air conditioner.

For example, the selection information is input by the user's operation through the input device 10C. In this case, the selection unit 42K receives the selection information from the input device 10C. The selection information is, for example, the identification information of the particular correction unit 42A or the information representing that the particular object B is estimated with priority.

If the selection information is the information detected by the sensor 10B, the selection unit 42K receives the selection information from the sensor 10B. For example, if the sensor 10B is the sensor that measures the vibration, the selection information is a result of measuring the vibration. If the sensor in is a position detection sensor that detects a position of the moving body 11C, the selection information is the information representing the position of the moving body 11C. If the sensor 10B is an internal sensor, the selection information is the information representing the driving state such as the vehicle speed or the acceleration of the moving body 11C, or the use status of a device such as a wiper, a headlight, or an air conditioner.

Then, upon the reception of the selection information, the selection unit 42K selects one correction unit 42A in accordance with the received selection information.

The selection unit 42K correlates the selection information and the identification information of the correction unit 42A, and stores the correlated information in the storage unit 20B in advance. For example, it is assumed that the correction unit 42K includes two correction units 42A (correction unit $42A_1$ and correction unit $42A_2$). Then, the correction unit $42A_1$ performs the correction by using a learned model in which a parameter to correct the correlation in accordance with the sunny weather is set. The correction unit $42A_2$ performs the correction by using a learned model in which a parameter to correct the correlation in accordance with the rainy weather is set.

In this case, the selection unit 42K correlates the selection information representing the use status of the wiper for the sunny weather, and the identification information of the correction unit $42A_1$, and stores the correlated information in the storage unit 23B in advance. The processing unit 42 correlates the selection information representing the use status of the wiper for the rainy weather, and the identification information of the correction unit $42A_2$, and stores the correlated information in the storage unit 20K in advance.

Then, upon the reception of the selection information representing the use status of the wiper, the selection unit 42K may select one correction unit 42A by reading the correction unit 42A for the selection information from the storage unit 20B.

The selection of the correction unit 42A by the selection unit 42K is not limited to the above method. For example, the selection unit 42K may calculate a predetermined variable from the received selection information, and select one correction unit 42A corresponding to the calculated variable.

In the correction unit 42H, one correction unit 42A selected by the selection unit 42K corrects the correlation in a manner similar to the correction unit 20H in the first embodiment.

Next, one example of the procedure of the information processing performed by the processing unit 42 is described.

The processing unit 42 performs a process similar to the process performed by the processing unit 20A in the first embodiment (see FIG. 9). However, the processing unit 42 performs an interrupting process illustrated in FIG. 13.

Figure 13:
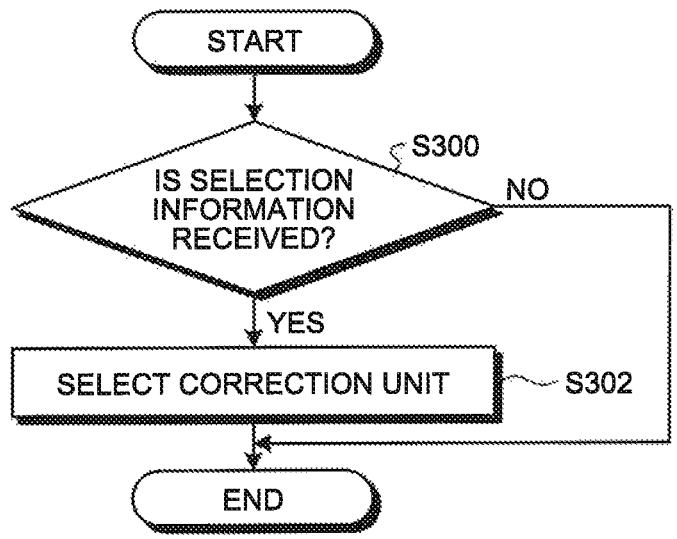
FIG. 13 is a flowchart illustrating one example of a procedure of an interrupting process.

FIG. 13 is a flowchart illustrating one example of the procedure of the interrupting process performed by the processing unit 42. The processing unit 42 performs the interrupting process illustrated in FIG. 13 while the information processing is performed according to the procedure in FIG. 9. Note that the processing unit 42 may perform the procedure in FIG. 13 between steps S108 and step S110 in the flowchart in FIG. 9.

First, the selection unit 42K determines whether the selection information is received (step S300). If it is determined that the selection information is not received at step S300 (No at step S300), the present routine ends. If it is determined that the selection information is received at step S300 (Yes at step S300), the process advances to step S302.

At step S302, the selection unit 42K selects the correction unit 42A in accordance with the selection information received at step S300 (step S302). At step S302, the selection unit 42K instructs the selected correction unit 42A to correct the correlation of the observation information 30 in the map M acquired by the acquisition unit 20G. The correction unit 42A having received the instruction of the correction performs a process similar to that of the correction unit 20H in the first embodiment by using the learned model used in the correction unit 42A in regard to the map M received from the acquisition unit 20G. Then, the present routine ends.

As described above, the information processing device 21C according to the present embodiment includes the correction units 42A using the learned models with different parameters. The selection unit 42K selects the correction unit 42A that corrects the correlation of the observation information 30.

Here, in a case in which the correction unit 42H is one and the learned model with the fixed parameter is used, in the environment different from the environment in which the parameter is set, the correction accuracy of the correlation of the observation information 30 may deteriorate. On the other hand, in the information processing device 21C according to the present embodiment, the selection unit 42K selects the correction unit 42A that corrects the correlation of the observation information 30 on the basis of the selection information.

Therefore, the correction unit 42A is selected in accordance with the selection condition represented by the selection information. That is to say, the information processing device 21C according to the present embodiment can correct the correlation in accordance with the selection information such as the ambient environment, the weather, the period of time, the travel state, or the user's preference.

Thus, the information processing device 21C according to the present embodiment can estimate the object B at the non-observation position more accurately in addition to the effect of the above embodiment.

Fourth Embodiment

The present embodiment will describe an example in which a condition to specify the object B from the sensing information is updated.

Figure 14:
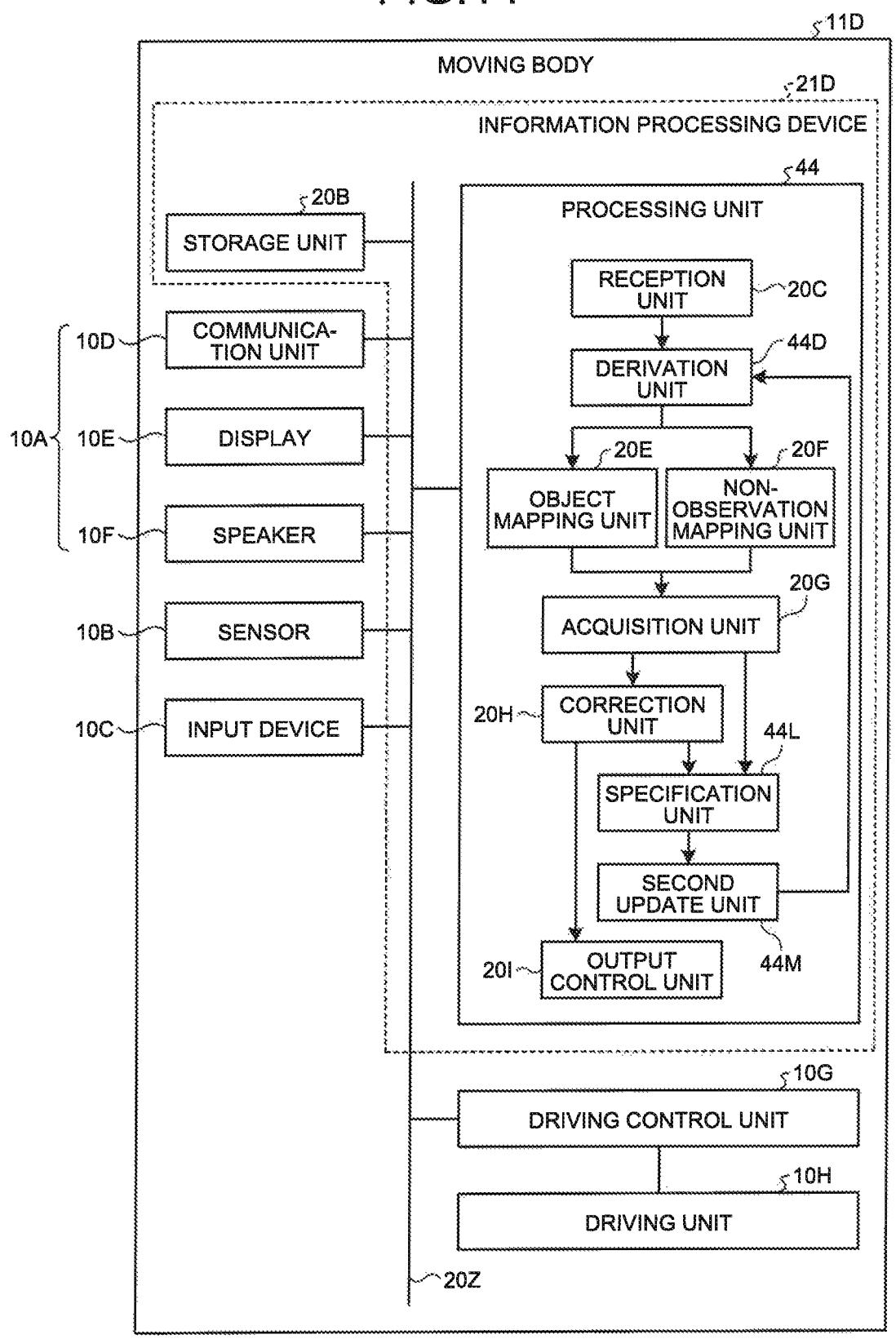
FIG. 14 is a block diagram illustrating one example of a moving body.

FIG. 14 is a block diagram illustrating one example of a moving body 11D including an information processing device 21D. Note that the moving body 11D is similar to the moving body 10 according to the first embodiment except that the moving body 11D includes the information processing device 21D instead of the information processing device 20.

The information processing device 21D includes a processing unit 44 and the storage unit 20B. The information processing device 21D includes the processing unit 44 instead of the processing unit 20A.

The processing unit 44 includes the reception unit 20C, a derivation unit 44D, the object mapping unit 20E, the non-observation mapping unit 20F, the acquisition unit 20G, the correction unit 20H, the output control unit 20I, a specification unit 44L, and a second update unit 44M. The processing unit 44 is similar to the processing unit 20A in the first embodiment except that the processing unit 44 includes the derivation unit 44D instead of the derivation unit 20D, and further includes the specification unit 44L and the second update unit 44M.

The specification unit 44L specifies the grid G whose correlation is corrected from the non-observation information 30B to the object information 30A by the correction of the correction unit 20H in the map M after being corrected by the correction unit 20H.

The second update unit 44M updates the condition that is used to determine the object B when the observation information 30 is derived from the sensing information on the basis of the map M after being corrected by the correction unit 20H.

As described in the first embodiment, the derivation unit 44D specifies the point 32 representing the object B among the points 32 represented by the sensing information. Then, the derivation unit 44D derives the object presence information 30C representing the presence of the object B in regard to the position P of the specified point 32.

The second update unit 44M updates the condition used in this determination of the object B on the basis of the map M after being corrected by the correction unit 20H.

Specifically, the second update unit 44M changes the condition used to determine the object B in regard to the position P in the actual space R for the grid G whose correlation is corrected by the correction unit 20H from the non-observation information 30B to the object information 30A. For example, the second update unit 44M changes the condition so that the derivation unit 44D further receives the detection intensity of each point 32 from the reception unit 20C without specifying all the observation points as the obstacle as the object B, and based on the detection intensity, the observation point more than or equal to a particular threshold is specified as the obstacle.

Specifically, the second update unit 44M updates so as to decrease the threshold corresponding to one example of the condition used to determine the object B in regard to the position P in the actual space R for the grid G whose correlation is corrected from the non-observation information 30B to the object presence information 30C. That is to say, the second update unit 44M updates the condition so that the object B is easily determined in regard to the position P.

On the other hand, the second update unit 44M updates so as to increase the threshold corresponding to one example of the condition used to determine the object B in regard to the position P in the actual space R for the grid G whose correlation is corrected from the non-observation information 30B to the object absence information 30D. That is to say, the second update unit 44M updates the condition so that the object B is less easily determined in regard to the position P.

If the sensing information is the camera image, the second update unit 44M may change the condition to determine the object B used in the template matching of the camera image. The second update unit 44B may change the method to a method of using another template.

Then, the derivation unit 44D determines the object B using the changed condition in regard to the point 32 at the position P for the grid G whose correlation is corrected previously by the correction unit 20H from the non-observation information 30B to the object information 30A among the points 32 represented by the sensing information.

For example, in some cases, the moving body 11D or the object B around the moving body 11D moves relative to the previous sensing timing of the sensor 10B. In such cases, the non-observation position where the observation is not performed by the sensor 10B at the previous sensing timing may be observed by the sensor 10B at this sensing timing.

In the present embodiment, the second update unit 44M updates the condition used to determine the object B by using the map M after being corrected by the correction unit 20H. Therefore, the information processing device 21D according to the present embodiment can estimate the object B stably and early by suppressing the non-detection or the over-detection of the object B when the reception unit 20C receives the sensing information of a new detection timing from the sensor 10B.

The method of updating the condition used to determine the object B is not limited to the above method.

For example, the second update unit 44M may update so as to increase the threshold corresponding to one example of the condition used to determine the object B in regard to the position P in the actual space R for the grid G whose correlation is corrected from the non-observation information 30B to the object presence information 30C. That is to say, the second update unit 44M may update the condition so that the object B is less easily determined in regard to that position.

The second update unit 44M may update the condition so that the object B is not determined in regard to the position P in the actual space R for the grid G whose correlation is corrected from the non-observation information 30B to the object information 30A.

As described above, in the information processing device 21D in the present embodiment, the specification unit 44L specifies the grid G whose correlation is corrected by the correction unit 20H from the non-observation information 30B to the object information 30A. The second update unit 44M updates the condition used to determine the object B when the observation information 30 is derived from the sensing information on the basis of the map M after being corrected by the correction unit 20H.

Here, when the condition used to determine the object B is fixed, the stable sensing of the object B may fail depending on the sensing environment. On the other hand, in the information processing device 21D in the present embodiment, the condition used to determine the object B when the observation information 30 is derived from the sensing information is updated based on the map M after being corrected by the correction unit 20H.

Therefore, in the information processing device 21D according to the present embodiment, the more accurate observation information 30 can be derived and the correlation can be corrected more accurately than in the above embodiment. In the information processing device 21D according to the present embodiment, the object B can be sensed early and stably even if the sensing environment varies.

Therefore, the information processing device 21D according to the present invention, the object B at the non-observation position can be estimated more accurately in addition to the effect of the above embodiment.

Fifth Embodiment

In the above embodiment, the corrected map M is output as the output information. However, in addition to that, various pieces of information on the corrected map M may be output as the output information.

Figure 15:
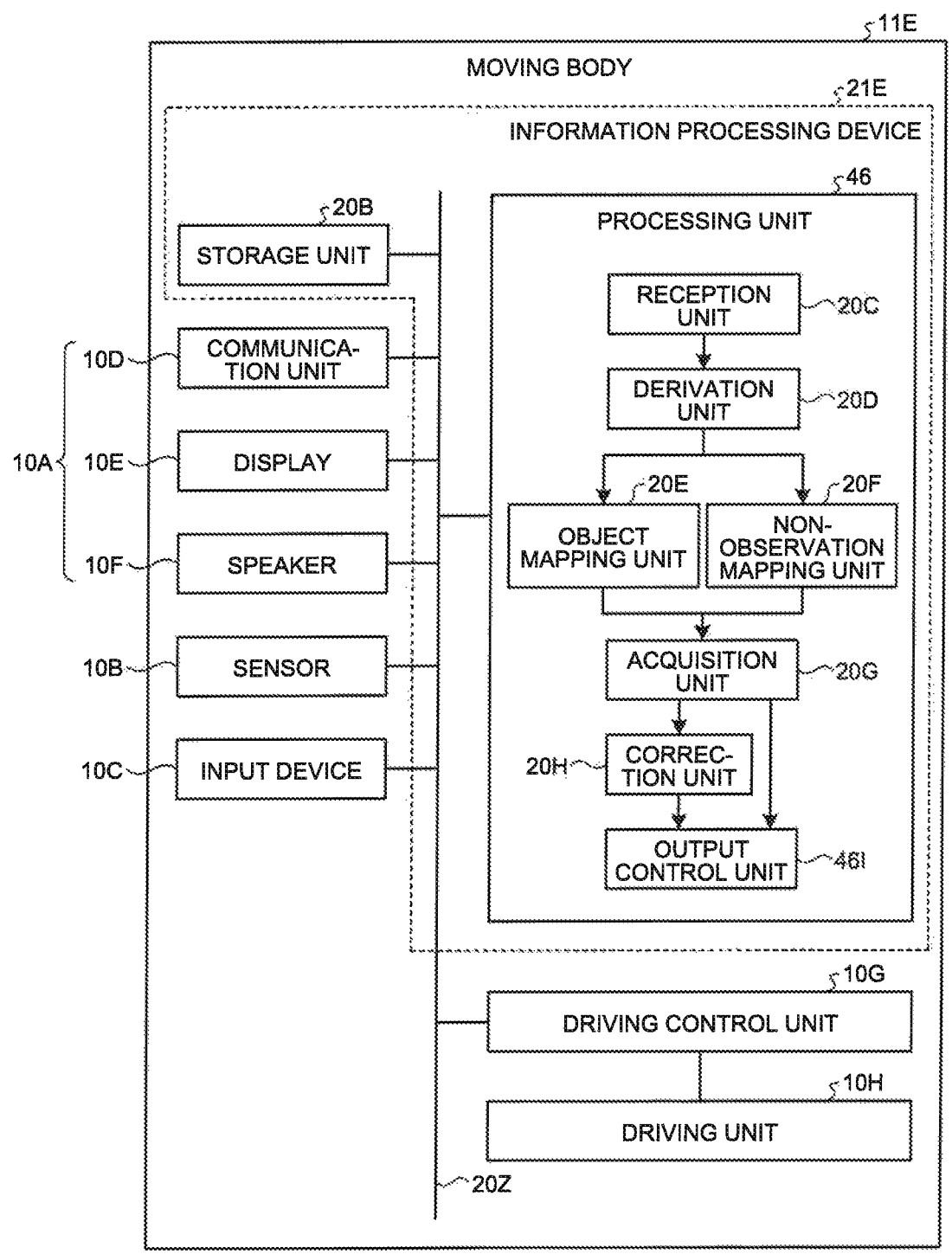
FIG. 15 is a block diagram illustrating one example of a moving body.

FIG. 15 is a block diagram illustrating one example of a moving body 11E including an information processing device 21E. Note that the moving body 11E is similar to the moving body 10 according to the first embodiment except that the moving body 11E includes the information processing device 21E instead of the information processing device 20.

The information processing device 21E includes a processing unit 46 and the storage unit 20B. The information processing device 21E includes the processing unit 46 instead of the processing unit 20A.

The processing unit 46 includes the reception unit 20C, the derivation unit 20D, the object mapping unit 20E, the non-observation mapping unit 20F, the acquisition unit 20G, the correction unit 20H, and an output control unit 46I. The processing unit 46 is similar to the processing unit 20A in the first embodiment except that the processing unit 46 includes the output control unit 46I instead of the output control unit 20I.

The output control unit 46I outputs the output information to at least one of the output unit 10A and the driving control unit 10G in a manner similar to the output control unit 20I in the first embodiment.

The first embodiment has described the case in which the output information is the map M after being corrected by the correction unit 20H. However, it is only necessary that the output information is the information representing the map M after being corrected by the correction unit 20H and the output information is not limited to the corrected map M.

For example, the output information may be the information representing the grid G whose correlation is corrected by the correction unit 20H in the map M after being corrected by the correction unit 20H.

The information representing the corrected grid G is, for example, the information representing at least one of the position of the grid G and the observation information 30 correlated by the correction of the grid G.

Specifically, the output control unit 46I acquires the map M before being corrected by the correction unit 20H from the acquisition unit 20G. The output control unit 46I acquires the map M corrected by the correction unit 20H. Then, the output control unit 46I specifies the grid G with which the non-observation information 30B is correlated in the map M before the correction, among the grids G with which the object information 30A is correlated in the corrected map M. Then, the output control unit 46I outputs the information representing the grid G whose correlation is corrected from, the non-observation information 30B to the object information 30A in the corrected map M, as the output information.

Therefore, in the present embodiment, the output control unit 46I can handle as the output information, only the grid G whose correlation is corrected from the non-observation information 30B to the object information 30A in the corrected map M. The output control unit 46I does not output the grid G with which the non-observation information 30B is correlated in the corrected map M and the grid G with which the object information 30A is correlated in the map M before the correction.

Note that the output control unit 46I may control at least one of the output unit 10A (communication unit 10D, display 10E, and speaker 10F) and the driving control unit 10G so that the information representing the grid G whose correlation is corrected from the non-observation information 30B to the object information 30A in the corrected map M is output as the output information.

For example, in the case in which the output control unit 46I controls the display 10E so as to output an image representing the output information, the output information may be an overlapped image. The overlapped image is an overlapped image of the camera image of the actual space F corresponding to the map M and the information (for example, a reference symbol) representing the grid G whose correlation is corrected in the corrected map M.

In this case, the output control unit 46I controls the display 10E so that the overlapped image of the camera image of the actual space R corresponding to the map M and the reference symbol representing the grid G whose correlation is corrected in the corrected map M is displayed.

The output control unit 46I may acquire the camera image of the actual space F from the sensor 10B. The reference symbol representing the grid G with the corrected correlation is, for example, an icon, text information, or the like representing that the correlation is corrected.

The output control unit 46I specifies the pixel position for each grid G in the corrected map M in the camera image, Then, the output control unit 46I generates the overlapped image in which the reference symbol representing the corrected position is overlapped on the camera image corresponding to the grid G with the corrected correlation in the corrected map M. Then, the output control unit 46I causes the display 10E to display the overlapped image.

By displaying the overlapped image in the display 10E, the area corresponding to the grid G with the corrected correlation can be emphasized on the camera image in the actual space R.

Note that the output information may be the information representing the region satisfying the predetermined condition in the map M after being corrected by the correction unit 20H. The predetermined condition may be determined in advance.

For example, the region in which the predetermined condition is satisfied is the grid G with which the object absence information 30D is correlated in the corrected map M. In addition, the region in which the predetermined condition is satisfied in a case in which the presence probability is correlated with the grid G in the corrected map M is the grid G with which the observation information 30 representing a presence probability of a predetermined value or more is correlated.

As described above, in the present embodiment, the output control unit 46I outputs as the output information, the information representing the grid G whose correlation is corrected by the correction unit 20H in the map M after being corrected by the correction unit 20H.

Therefore, in the present embodiment, the output information with the change before and after the correction of the map M emphasized can be output in addition to the effect of the above embodiment.

Hardware Structure

Figure 16:
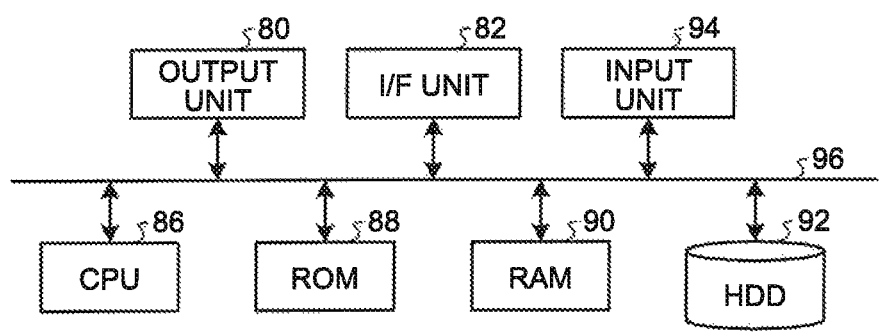
FIG. 16 is a hardware structure diagram.

Next, one example of the hardware structure of the information processing device 20, the information processing device 21B, the information processing device 21C, the information processing device 21D, and the information processing device 21E in the above embodiments will be described. FIG. 16 is a diagram illustrating one example of the hardware structure of the information processing device 20, the information processing device 21B, the information processing device 21O, the information processing device 21D, and the information processing device 21E in the above embodiments.

The information processing device 20, the information processing device 21B, the information processing device 21C, the information processing device 21D, and the information processing device 21E in the above embodiments each include a control device such as a central processing unit (CPU) 86, a storage devices such as a read only memory (ROM) 88, a random access memory (RAM) 90, or a hard disk drive (HDD) 92, an I/F unit 82 corresponding to the interface with various devices, an output unit 80 that outputs various information such as the output information, an input unit 94 that receives the user's operation, and a bus 96 that connects those units, and include a hardware structure using a general computer.

In the information processing device 20, the information processing device 21B, the information processing device 21C, the information processing device 21D, and the information processing device 21E in the above embodiments, the CPU 86 loads computer programs from the ROM 88 to the RAM 90 and executes the computer programs, so that each function is achieved on the computer.

Note that the computer programs for executing each process performed in the information processing device 20, the information processing device 21B, the information processing device 21C, the information processing device 21D, and the information processing device 21E in the above embodiments may be stored in the HDD 92. Alternatively, the computer programs for executing each process performed in the information processing device 20, the information processing device 21E, the information processing device 21C, the information processing device 21D, and the information processing device 21E in the above embodiments may be provided by being incorporated in the ROM 88.

The computer programs for executing each process performed in the information processing device 20, the information processing device 21B, the information processing device 21O, the information processing device 21D, and the information processing device 21E in the above embodiments may be stored in a computer-readable storage medium such as a CD-ROM, a CD-R, a memory card, a digital versatile disc (DVD), or a flexible disk (FD) in an installable or executable format and provided as a computer program product. Furthermore, the computer programed for executing each process performed in the information processing device 20, the information processing device 21B, the information processing device 21C, the information processing device 21D, and the information processing device 21E in the above embodiments may be stored on a computer connected to a network such as the Internet and provided by being downloaded through the network. Moreover, the computer programs for executing each process performed in the information processing device 20, the information processing device 21B, the information processing device 21C, the information processing device 21D, and the information processing device 21E in the above embodiments may be provided or distributed through the network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more processors configured to:
receive sensing information from a sensing unit;
derive, based on the received sensing information, observation information for each position in an actual space sensed by the sensing unit, the observation information for each position in the actual space being either observed object information or undetected information, the observed object information being either object presence information representing that an object is present or object absence information representing that the object is absent, and the undetected information being information representing that the presence or absence of the object is unknown;
correlate the observed object information derived for a first plurality of positions in the actual space with a plurality of grids in a particular space representing the actual space in a coordinate system, to generate an object map in the particular space;
correlate the undetected information derived for a second plurality of positions in the actual space with the plurality of grids in the particular space, to generate a non-observation map;
acquire a map which includes the object map and the non-observation map, wherein, for each of the plurality grids in the particular space in the acquired map, the observation information corresponding to either the observed object information or the undetected information is correlated; and
correct the undetected information correlated with a first grid among the plurality of grids in the acquired map by using a learned model based on the observation information correlated with other peripheral grids disposed in a periphery of the first grid.

2. The device according to claim 1, wherein the observed object information represents a presence probability of the object.

3. The device according to claim 1, wherein the one or more processors correlate a presence probability of the object with a grid among the plurality of grids in the particular space in the object map as the observed object information.

4. The device according to claim 1, wherein
the particular space is represented by the grids along coordinate axes.

5. The device according to claim 4, wherein
the coordinate axes are coordinate axes of a rectangular coordinate system or a polar coordinate system.

6. The device according to claim 1, wherein
the one or more processors correct the undetected information correlated with the first grid in the acquired map to the observation information.

7. The device according to claim 1, wherein
the one or more processors correct the object information correlated with a second grid in the acquired map.

8. The device according to claim 7, wherein
the one or more processors correct the observation information correlated with the second grid in the acquired map while changing a parameter of the learned model so that the correction of the object information correlated with the second grid in the acquired map is suppressed as compared with the correction of the undetected information correlated with the first grid in the acquired map.

9. The device according to claim 1, wherein
the observation information includes a plurality of pieces of the observation information derived from a plurality of pieces of the sensing information sensed at different timings, and the acquired map includes a plurality of maps acquired based on the plurality of pieces of observation information, the one or more processors further configured to update a parameter of the learned model based on the plurality of maps acquired based on the plurality of pieces of observation information.

10. The device according to claim 1, wherein
the one or more processors are configured to perform a plurality of correction functions that use the learned model with different parameters, and select, from among the plurality of correction functions, a correction function that corrects the correlation of the observation information based on selection information.

11. The device according to claim 1, wherein
the one or more processors are further configured to specify the first grid with which the undetected information is correlated and is corrected from the undetected information to the object information.

12. The device according to claim 11, wherein the one or more processors are further configured to update, based on the acquired map after being corrected, a condition used to determine the object when the observation information is derived from sensing information.

13. The device according to claim 1, wherein
the one or more processors are further configured to control a driving unit of a moving body based on the acquired map after being corrected.

14. The device according to claim 1, wherein
the one or more processors are further configured to output information representing the acquired map after being corrected.

15. The device according to claim 14, wherein
the output information is information representing the first grid with which the undetected information is corrected by the one or more processors in the acquired map.

16. The device according to claim 14, wherein
the output information is an overlapped image of a camera image of the actual space corresponding to the acquired map, and information representing the first grid with which the undetected information is corrected by the one or more processors in the acquired map.

17. The device according to claim 14, wherein
the output information is information representing a region in which a predetermined condition is satisfied in the acquired map after being corrected by the one or more processors.

18. The device according to claim 17, wherein
the region in which the predetermined condition is satisfied is a region with which the observation information representing a presence probability of a predetermined value or more is correlated in the acquired map after being corrected by the one or more processors.

19. A learned model used for a method, the method comprising:
receiving sensing information from a sensing unit;
deriving, based on the received sensing information, observation information for each position in an actual space sensed by the sensing unit, the observation information for each position in the actual space being either observed object information or undetected information, the observed object information being either object presence information representing that an object is present or object absence information representing that the object is absent, and the undetected information being information representing that the presence or absence of the object is unknown;
correlating the observed object information derived for a first plurality of positions in the actual space with a plurality of grids in a particular space representing the actual space in a coordinate system, to generate an object man in the particular space;
correlating the undetected information derived for a second plurality of positions in the actual space with the plurality of grids in the particular space, to generate a non-observation map;
acquiring a map which includes the object map and the non-observation map, wherein, for each of the plurality grids in the particular space in the acquired map, the observation information corresponding to either the observed object information or the undetected information is correlated; and
correcting the undetected information correlated with a first grid among the plurality of grids in the acquired map based on the observation information correlated with other peripheral grids disposed in a periphery of the first grid.

20. A computer program product having a non-transitory computer readable medium including programmed instructions, wherein the instructions, when executed by a computer, cause the computer to perform:
receiving sensing information from a sensing unit;
deriving, based on the received sensing information, observation information for each position in an actual space sensed by the sensing unit, the observation information for each position in the actual space being either observed object information or undetected information, the observed object information being either object presence information representing that an object is present or object absence information representing that the object is absent, and the undetected information being information representing that the presence or absence of the object is unknown;
correlating the observed object information derived for a first plurality of positions in the actual space with a plurality of grids in a particular space representing the actual space in a coordinate system, to generate an object map in the particular space;
correlating the undetected information derived for a second plurality of positions in the actual space with the plurality of grids in the particular space, to generate a non-observation map;
acquiring a map which includes the object map and the non-observation map, wherein, for each of the plurality grids in the particular space in the acquired map, the observation information corresponding to either the observed object information or the undetected information is correlated; and
correcting the undetected information correlated with a first grid among the plurality of grids in the acquired map by using a learned model based on the observation information correlated with other peripheral grids disposed in a periphery of the first grid.

* * * * *